US008432400B1

(12) United States Patent
Weskamp

(10) Patent No.: US 8,432,400 B1
(45) Date of Patent: Apr. 30, 2013

(54) TRANSITIONAL ANIMATION FOR GENERATING TREE MAPS

(75) Inventor: Marcos Weskamp, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1023 days.

(21) Appl. No.: 12/326,645

(22) Filed: Dec. 2, 2008

(51) Int. Cl.
*G06T 13/00* (2011.01)

(52) U.S. Cl.
USPC .......................................... 345/473

(58) Field of Classification Search .................. None
See application file for complete search history.

(56) References Cited

U.S. PATENT DOCUMENTS

| 7,340,678 B2* | 3/2008 | Chiu et al. ................. 715/734 |
| 7,737,979 B2* | 6/2010 | Robertson et al. .......... 345/473 |
| 7,870,509 B2* | 1/2011 | Cao et al. .................. 715/853 |
| 2007/0234202 A1* | 10/2007 | Lyness .................... 715/513 |
| 2008/0271046 A1* | 10/2008 | Lipton et al. .............. 719/311 |
| 2009/0326921 A1* | 12/2009 | Robertson et al. ............. 704/9 |
| 2010/0333017 A1* | 12/2010 | Ortiz ...................... 715/800 |

OTHER PUBLICATIONS

"Interactive Information Visualization of a Million Items", [Online]. Retrieved from the Internet: <URL:http://www.cs.umd.edu/hcil/millionvis>, (Oct. 15, 2008), 5 pgs.

"Visualization of File System Hierarchies", *Lulea University of Technology*, Department of Computer Schience and Electrical Engineering www.csee.ltu.se, 3 pgs, (last edited 2005).
Bladh, T., et al., "The Effect of Animated Transitions on User Navigation in 3D Tree-Maps", *Proceedings. Ninth International Conference on Information Visualisation , IEEE*, (2005), 297-305.
Bladh, Thomas, et al., "Extending Tree-Maps to Three Dimensions: A Comparative Study", *Lecture Notes in Computer Science, Computer Human Interaction*, Department of Computer Science and Electrical Engineering Lulea University of Technology, (2004), 50-59.
Heer, Jeffrey, et al., "Animated Transitions in Statistical Data Graphics", *IEEE Information Visualization (InfoVis)*, (2007), 8 pgs.

* cited by examiner

*Primary Examiner* — Daniel Hajnik
*Assistant Examiner* — Anh-Tuan V Nguyen
(74) *Attorney, Agent, or Firm* — Schwegman Lundberg Woessner P.A.

(57) ABSTRACT

A two-dimensional tree representation of a hierarchical data structure is displayed. A first transitional animation is generated that graphically represents a first portion of the two-dimensional tree representation of the hierarchical data structure as a sequence of three-dimensional parallelograms, the sequence to be displayed between a first location with respect to the two-dimensional tree representation and a second location with respect to a two-dimensional tree representation of the hierarchical data structure. A final form three-dimensional parallelogram included in the sequence of three-dimensional parallelograms is displayed at the second location with respect to the three-dimensional tree representation of the hierarchical data structure.

23 Claims, 22 Drawing Sheets

TRANSITIONAL ANIMATION FOR GENERATING TREE MAPS

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Adobe Systems Incorporated. All Rights Reserved.

TECHNICAL FIELD

The present application relates generally to the technical field of algorithms and programming and, in one specific example, Graphical User Interfaces (GUI).

BACKGROUND

Tree maps display tree-structured data using nested rectangles. Some well known tree-map algorithms include a binary tree-map algorithm, an ordered tree-map algorithm, a slice-and-dice tree-map algorithm, a squarified tree-map algorithm, or a strip tree-map algorithm. Tree-maps display data organized as a structured hierarchy. This structured hierarchy includes data organized as a tree.

BRIEF DESCRIPTION OF THE DRAWINGS

Some embodiments are illustrated by way of example and not limitation in the figures of the accompanying drawings in which.

DETAILED DESCRIPTION

Figure 1:
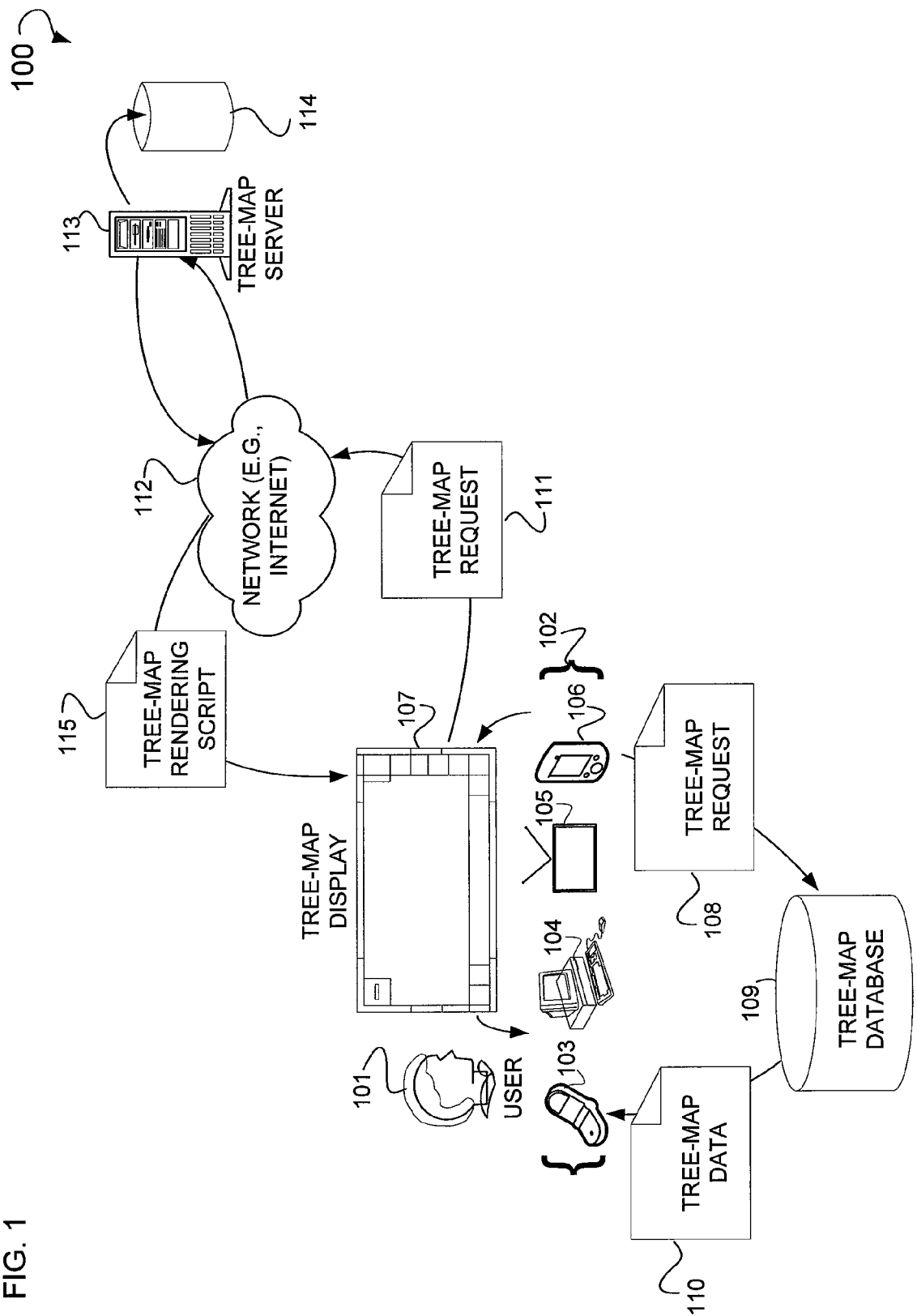
FIG. 1 is a diagram of a system, according to an example embodiment, used to retrieve tree-map data and/or a tree-map rendering script.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method are shown for using a transitional animation to illustrate the generation of a three-dimensional tree map. A transitional animation is a sequence of objects displayed in a display area where during the display of the sequence, the dimensions of the objects and the coordinates of the objects change. A three-dimensional tree map is a graphical representation of tree-structured data using nested three-dimensional parallelograms such as cubes, or cuboids. Nested includes one three-dimensional parallelogram displayed within another three-dimensional parallelogram. Objects as referenced herein include three-dimensional parallelograms. An example of a three-dimensional parallelogram is a cuboid (e.g., a rectangular prism). A cuboid is a figure bounded by six rectangular faces to form a rectangular box. All angles are right angles, and opposite faces of a cuboid are equal. Dimensions include the height, width, and depth of the three-dimensional parallelogram. Coordinates include the X coordinate and Y coordinate positions of the three-dimensional parallelogram within a display area. A display area may include a frame or sub frame of a GUI.

For the purposes of illustration, the three-dimensional parallelograms illustrated herein are cuboids referenced as "3D rectangles." A three-dimensional tree-map, and the 3D rectangles displayed therein, are generated using a tree-map algorithm. Some well known tree-map algorithms include a binary tree-map algorithm, an ordered tree-map algorithm, a slice-and-dice tree-map algorithm, a squarified tree-map algorithm, or a strip tree-map algorithm. In one example embodiment, tree-map data in the form of tree-structured data is retrieved from a data store. This tree-structured data may take the form of a file directory or some other hierarchically organized set of data. One of the aforementioned tree-map algorithms is applied to the tree-map data so as to generate final height and width values, and final X and Y coordinate values for 3D rectangles each of which represents a file or sub file in a file directory. Collectively, these final height, width, X and Y coordinate values are referenced herein as a "final form." An X or Y coordinate value may be a pixel value within a display area. A static depth value is also used to represent the depth of the parallelogram (e.g., a third dimension). This static depth value is preset. Preset values are retrieved for each of the directories and sub directories so as to provide a preset height, width, depth, and X and Y coordinate values for each of the 3D rectangles corresponding to each of the files and sub files. The preset height, width, and X and Y coordinate values are incremented or decremented to approximate the final form, and the 3D rectangle displayed as part of the above referenced transitional animation. This process of incrementing or decrementing and displaying of the 3D rectangles continues until each 3D rectangle is displayed in its final form within the tree map based upon the final height and width and X and Y coordinate values generated by the tree-map algorithm. Additionally, in some example embodiments, a 3D rectangle is rotated as part of the transitional animation such that the X axis of the 3D rectangle becomes the Y axis or vice versa.

In some example embodiments, the system and method illustrated herein are implemented by a single computer system, while in other embodiments the system and method are implemented by two or more computers acting in a server-client arrangement. Some example embodiments may include, a single computer implementing the system and method illustrated herein such that a tree-map request is made, and tree-map data retrieved and processed to generate a transitional animation illustrating the creation of a three-dimensional tree map. Moreover, in some example embodiments, a tree-map request is sent to a tree-map server. The tree-map server generates a tree-map rendering script that, when executed, displays a creation of a three-dimensional tree-map using a transitional animation.

FIG. 1 is a diagram of an example system 100 used to retrieve tree-map data and/or a tree-map rendering script. Shown is a user 101, who utilizing any one of a number of devices 102, generates a tree-map request 108. These devices 102 include a cell phone 103, a computer system 104, a television monitor 105, a Person Digital Assistant (PDA) 106, or a smart phone (not shown). One of these devices 102 is utilized to generate a tree-map display 107. Using this tree-map display 107, the user 101 may generate the tree-map request 108, which is provided to a tree-map database 109. This tree-map database 109 may be a native or non-native data store that is communicatively coupled to one of the devices 102. Communicatively coupled includes, for example, a physical or logical connection. Tree-map data 110 is retrieved from the tree-map database 109 and provided to the one or more devices 102, which process the tree-map data 110 for use in the generation of a transitional animation used in displaying a rendered three-dimensional tree map.

In some example embodiments, the tree-map display 107 is utilized by the user 101 to generate a tree-map request 111. This tree-map request 111 is transmitted across a network 112 and received by a tree-map server 113. Communicatively coupled to this tree-map server 113 is a tree-map database 114. This tree-map database 114 may be a native or non-native data store that is operatively connected to the tree-map server 113. The tree-map server 113 retrieves tree-map data (not shown) from the tree-map database 114. This tree-map data is processed by the tree-map server 113, and used to generate a tree-map rendering script 115. This tree-map rendering script 115 is transmitted across the network 112 and received by one of the devices 102. This tree-map rendering script 115 is processed by one of the devices 102 to render a transitional animation used in the rendered three-dimensional tree map. This tree-map rendering script 115 may be written in ACTIONSCRIPT™, PERL™, Visual Basic Script (VB-Script™), JAVA™, JAVASCRIPT™, an eXtensible Markup Language (XML), Macromedia-XML (MXML™), or some other suitable scripting language.

Figure 2:
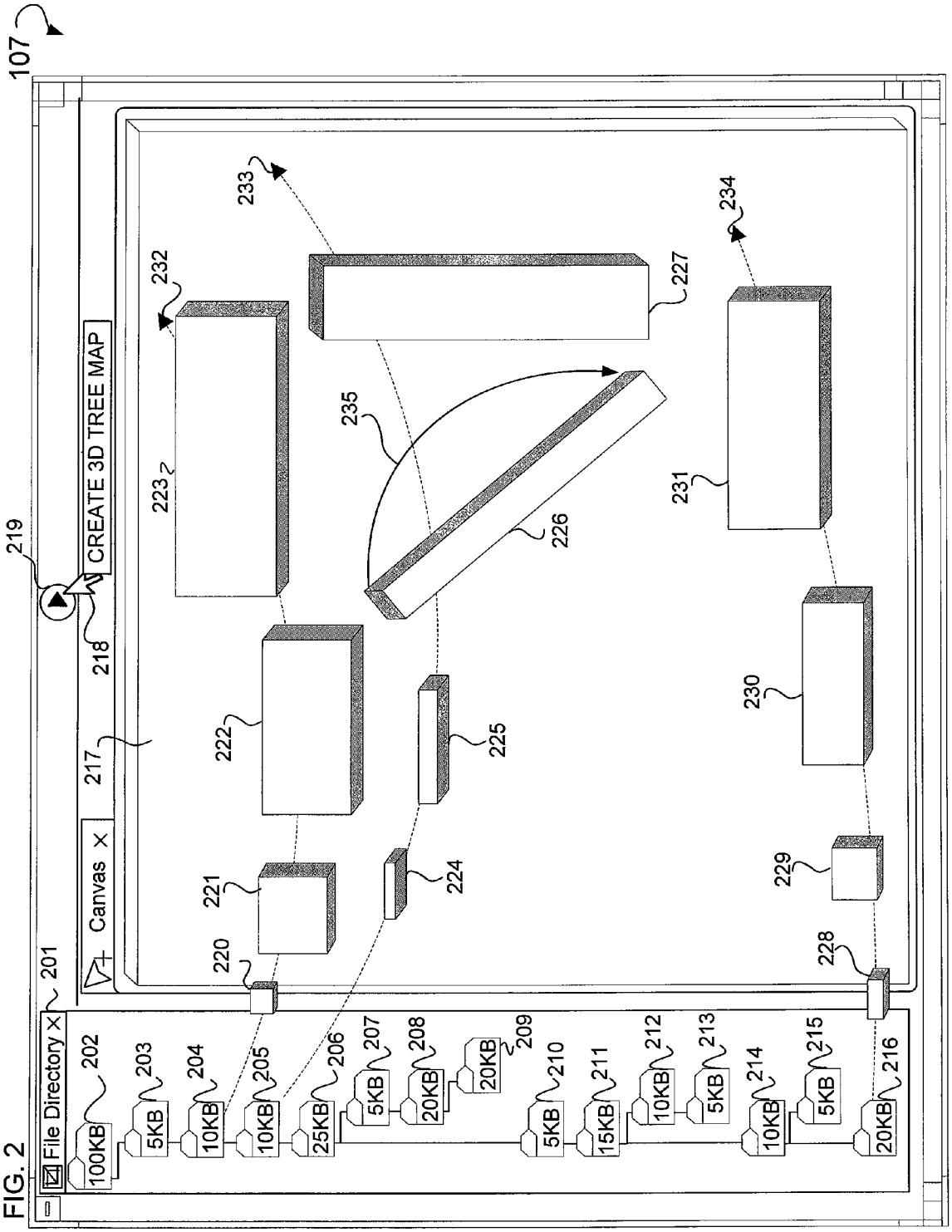
FIG. 2 is a diagram of a tree-map display, according to an example embodiment, illustrating transitional animations.

FIG. 2 is a diagram of an example tree-map display 107 illustrating transitional animations. Shown is a file directory 201 that includes structured data in the form of files 202 through 216. Also shown is a display area 217 in the form of a canvas. This display area 217 will be used to render the three-dimensional tree map. Also shown is a graphical pointer 218 that is used to execute, for example, a button 219 to generate the transitional animation used in rendering the three-dimensional tree map. Shown is a transitional animation 232 that illustrates the rendering and transition of a sequence of 3D rectangles 220 through 223. The preset values outlined below are included as part of this transitional animation.

In one example embodiment, a file 204 is converted into a 3D rectangle 220 using various preset values for the height, width, and X and Y coordinates for the 3D rectangle 220. Based upon final height, width and X and Y coordinate values generated by a tree-map algorithm, the 3D rectangle 220 transitions into a 3D rectangle 221, where the 3D rectangle 221 has height, width and X and Y coordinates that differ from the 3D rectangle 220. Further, the 3D rectangle 221 transitions into the 3D rectangle 222, where the 3D rectangle 222 has height, width, and X and Y coordinate values that differ from the 3D rectangle 221. Moreover, the 3D rectangle 222 transitions into a 3D rectangle 223 that has height, width and X and Y coordinate values that differ from the 3D rectangle 222. The X and Y coordinate positions may represent first and second locations with respect to the structured data.

Additionally shown is a transitional animation 233 that illustrates the rendering and transition of a sequence of 3D rectangles 224 through 227. Shown is a file 205 represented via the use of certain preset height, width, and X and Y coordinate values in the form as represented by the 3D rectangle 224. This 3D rectangle 224 transitions into a 3D rectangle 225, where the 3D rectangle 225 has height, width, and X and Y coordinate values that differ from the 3D rectangle 224. This 3D rectangle 225 transitions into a 3D rectangle 226 where the 3D rectangle 226 has height, width and X and Y coordinate values that differ from the 3D rectangle 225.

Moreover, illustrated is a rotation 235, wherein the 3D rectangle 226 rotates along a Y axis as reflected at 235. The rotation 235 is a clockwise rotation. This rotation 235 occurs where, for example, 3D rectangle 226 has a width equal to the height of 3D rectangle 227. The operations used to implement this rotation 235 are illustrated below. The 3D rectangle 226 transitions into the 3D rectangle 227, where the 3D rectangle 227 has width and X and Y coordinate values that differ from the 3D rectangle 226.

Further shown, as one example embodiment, is a transitional animation 234 that includes the rendering and transition of a sequence of 3D rectangles 228 through 231. The file 216 transitions into the 3D rectangle 228 based upon certain preset height, width, and X and Y coordinate values. The 3D rectangle 228 transitions into a 3D rectangle 229 where the 3D rectangle 229 has height, width, and X and Y coordinate values that differ from the 3D rectangle 228. 3D rectangle 229 transitions into a 3D rectangle 230 where the 3D rectangle 230 has height, width and X and Y coordinate values that differ from the 3D rectangle 229. 3D rectangle 230 transitions into a 3D rectangle 231, where the 3D rectangle 231 has height, width and X and Y coordinate values that differ from the 3D rectangle 230. The various transitional animations illustrated herein (e.g., transitional animations 232 through 234) are used in generating the three-dimensional tree-maps illustrated below (See e.g., FIG. 3 through FIG. 10). The example transitional animations illustrated below display a single 3D rectangle in the sequence of 3D rectangles that make up a transitional animation.

In some example embodiments, the graphical pointer 218, which is controlled by an input device, is used to execute the button 219 that is displayed as part of the tree-map display 107. The graphical pointer is a cursor, and the input device may be a mouse, keyboard, light pen, touch screen, or other suitable input device. Execution of the button 219 may be facilitated through a right-click function, a mouse-over function, or a left-click function.

Figure 3:
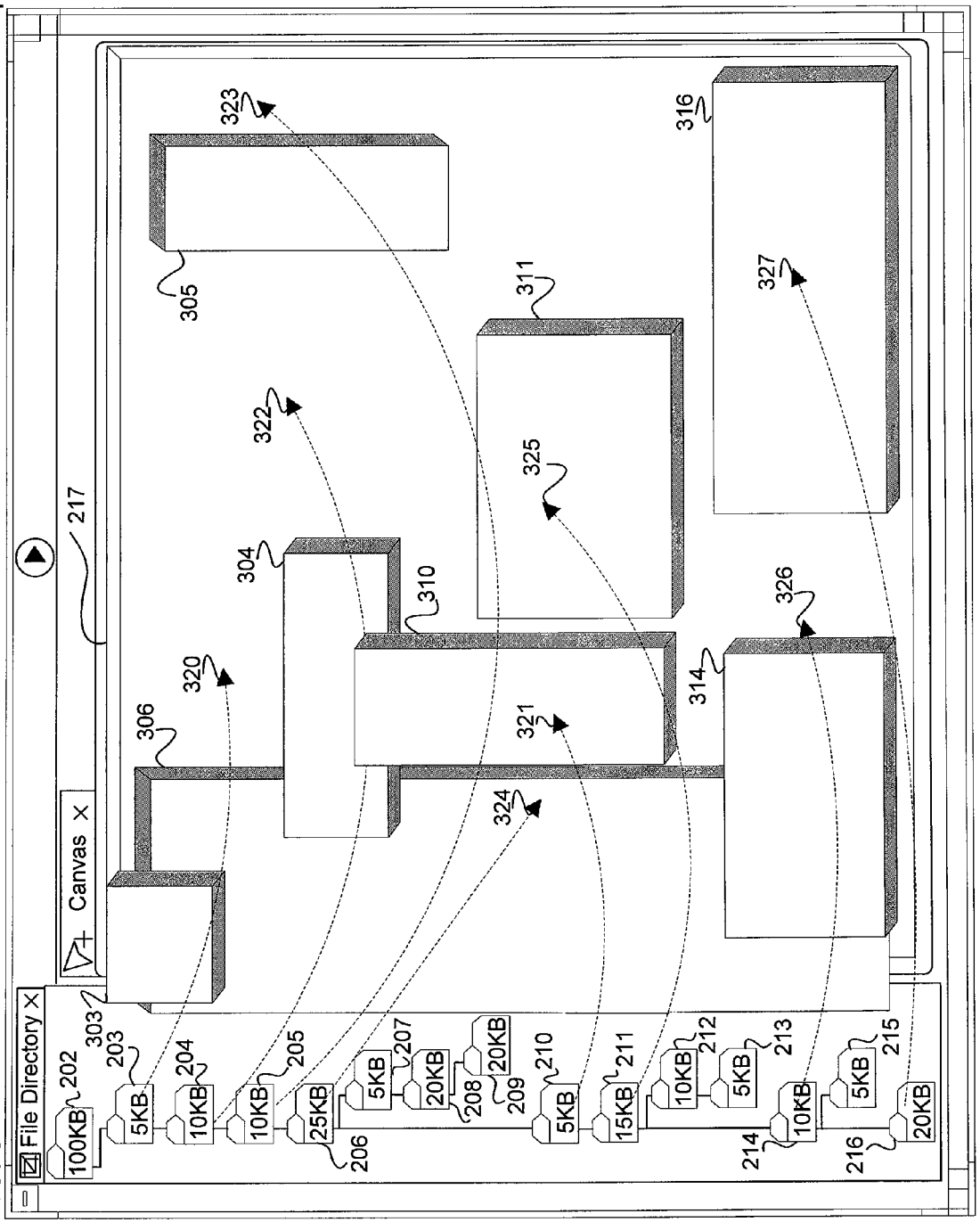
FIG. 3 is diagram of a tree-map display, according to an example embodiment, illustrating transitional animations used to generate and render first level nodes of a three-dimensional tree map.

FIG. 3 is a tree-map display 107 illustrating transitional animations used to generate and render first level nodes of a three-dimensional tree map. A level of a tree-map node corresponds to the level or height of a tree or tree-structured data. Shown are transitional animations 320 through 327. Shown is the file 203 that is converted into the 3D rectangle 303 using transitional animation 320. Further shown is the file 204 that is converted into the 3D rectangle 304 using the transitional animation 322. Also shown is file 205 that is converted into the 3D rectangle 305 using the transitional animation 323. Further shown is the file 206 that is converted into the 3D rectangle 306 using the transitional animation 324. Also shown is the file 210 that is converted into the 3D rectangle 310 using the transitional animation 321. Additionally, shown is the file 211 that is converted into the 3D rectangle 311 using the transitional animation at 325. Further, shown is the file 215 that is converted into the 3D rectangle 314 using the transitional animation 326. Moreover, shown is the file 216 that is converted into the 3D rectangle 316 using the transitional animation 327. As shown in FIG. 2, each of these transitional animations 320 through 327 include various examples of 3D rectangles reflecting each of the previously referenced files 203, 204, 205, 206, 210, 211, 214 and 216.

Figure 4:
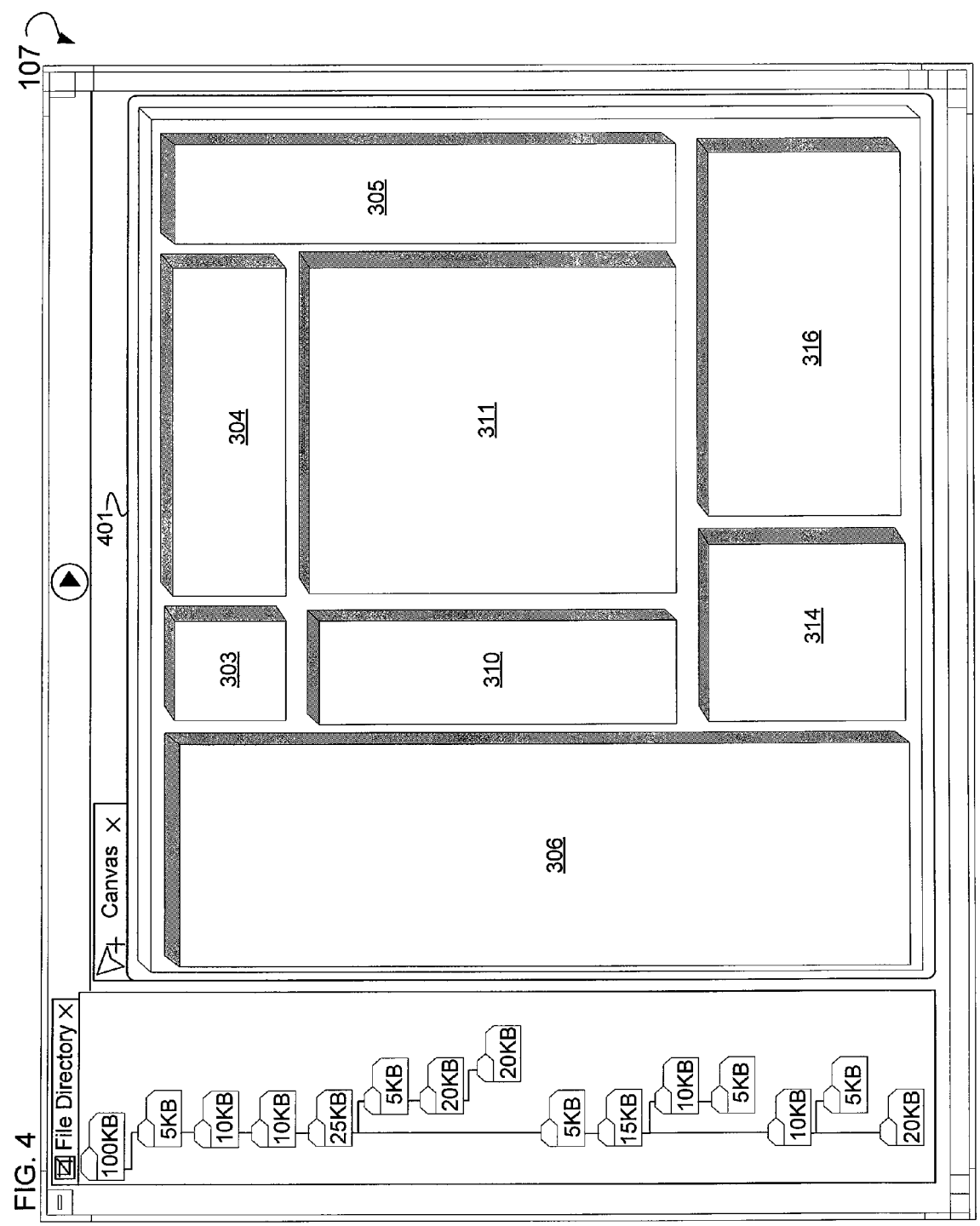
FIG. 4 is a diagram of a tree-map display, according to an example embodiment, illustrating a three-dimensional tree map with first level nodes.

FIG. 4 is a diagram of an example tree-map display 107 illustrating a three-dimensional tree-map 401 with first level nodes. These first level nodes include the previously referenced 3D rectangles 306, 303, 310, 314, 304, 311, 316 and 305. As will be more fully discussed below, second level nodes from the tree-structured data will be added to this three-dimensional tree-map 401.

Figure 5:
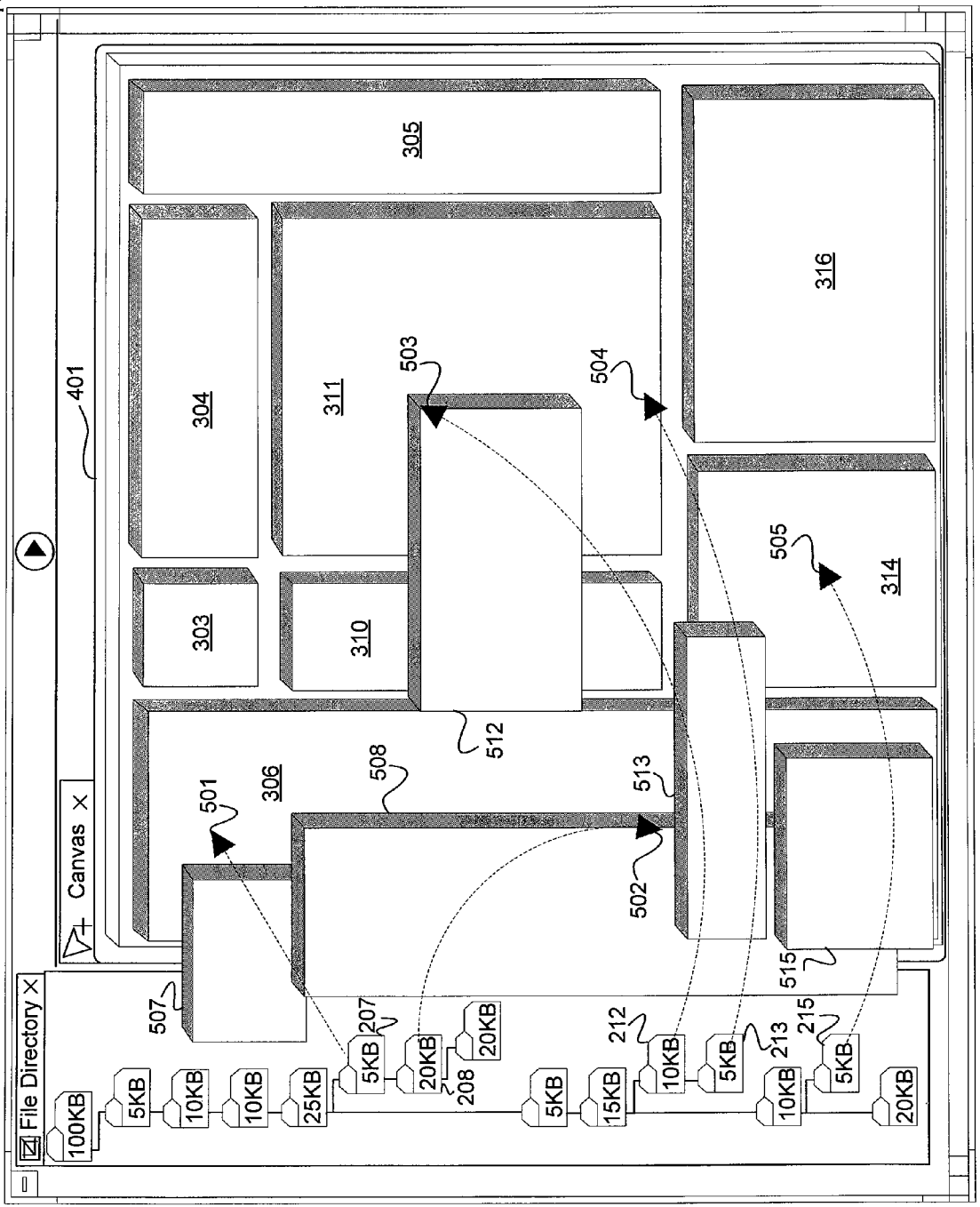
FIG. 5 is a diagram of a tree-map display, according to an example embodiment, illustrating the addition of second level nodes to a three-dimensional tree map using transitional animations.

FIG. 5 is a diagram of an example tree-map display 107 illustrating the addition of second level nodes to the three-dimensional tree map 401 using transitional animations. Shown are transitional animations 501 through 505. Illustrated is a file 207 that is converted into a 3D rectangle 507 using the transitional animation 501. Further, a file 208 is converted into a 3D rectangle 508 using the transitional animation 502. Additionally, the file 212 is converted into the 3D rectangle 512 using the transitional animation 503. Moreover, the file 213 is converted into a 3D rectangle 513 using the transitional animation 504. The file 215 is converted into the 3D rectangle 515 using the transitional animation 505. As previously discussed in FIG. 2, while only individual 3D rectangles are shown here as a part of each of the transitional animations 501 through 505, additional 3D rectangles may be used and displayed. These additional 3D rectangles would more fully illustrate the adjustment of each of the 3D rectangles 507, 508, 512, 513 and 515 to meet the final height, width and X and Y coordinate values as dictated by a tree-map algorithm.

Figure 6:
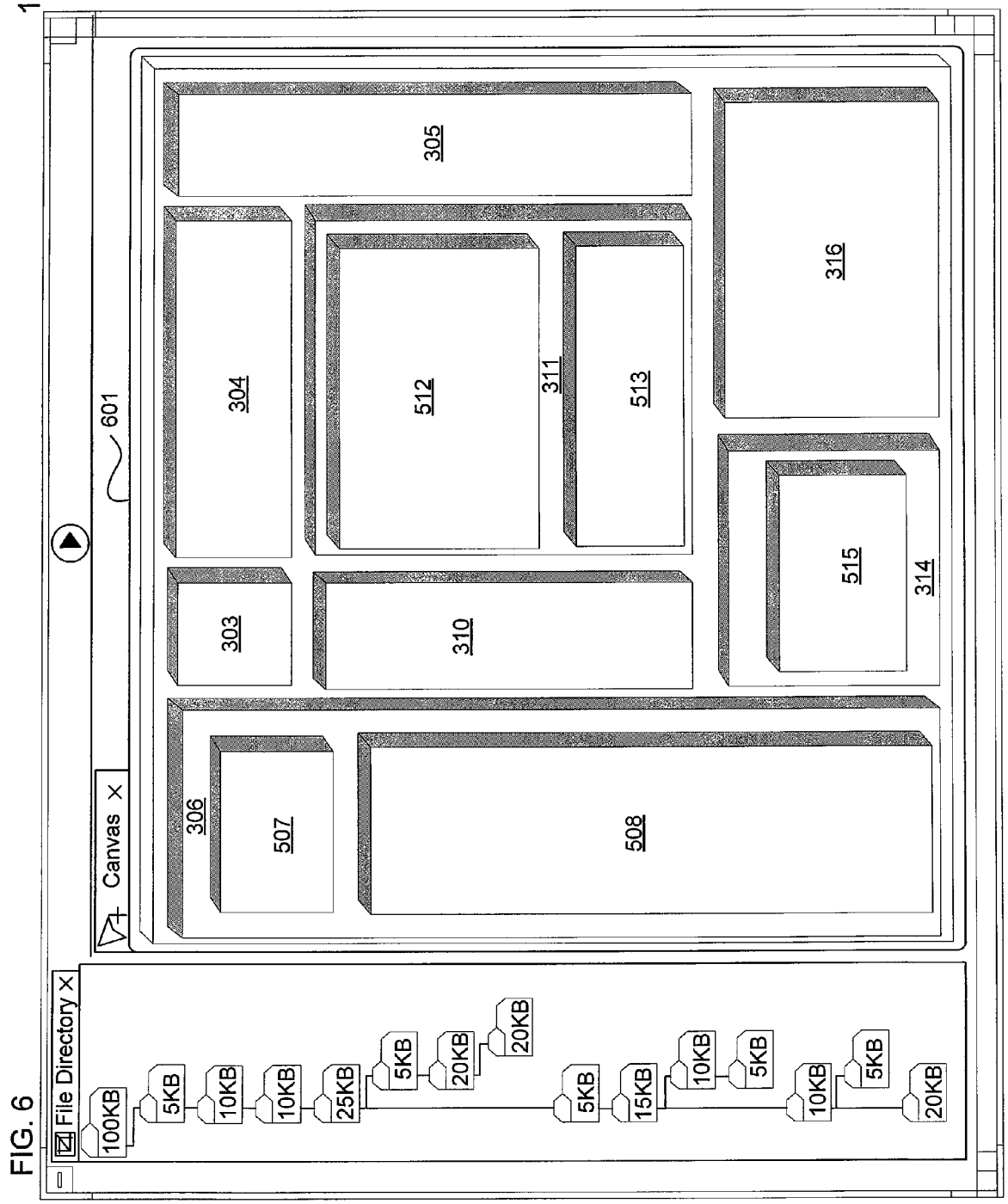
FIG. 6 is diagram of a tree-map display, according to an example embodiment, illustrating both first and second level nodes for a three dimensional tree map.

FIG. 6 is a diagram of an example three-dimensional tree map 601 illustrating first and second level nodes. As previously discussed, the first level nodes include, for example, 3D rectangles 306, 303, 310, 314, 304, 311, 316 and 305. To these first level nodes in the form of 3D rectangles are added second level nodes that include 3D rectangles 507, 508, 512, 513 and 515.

Figure 7:
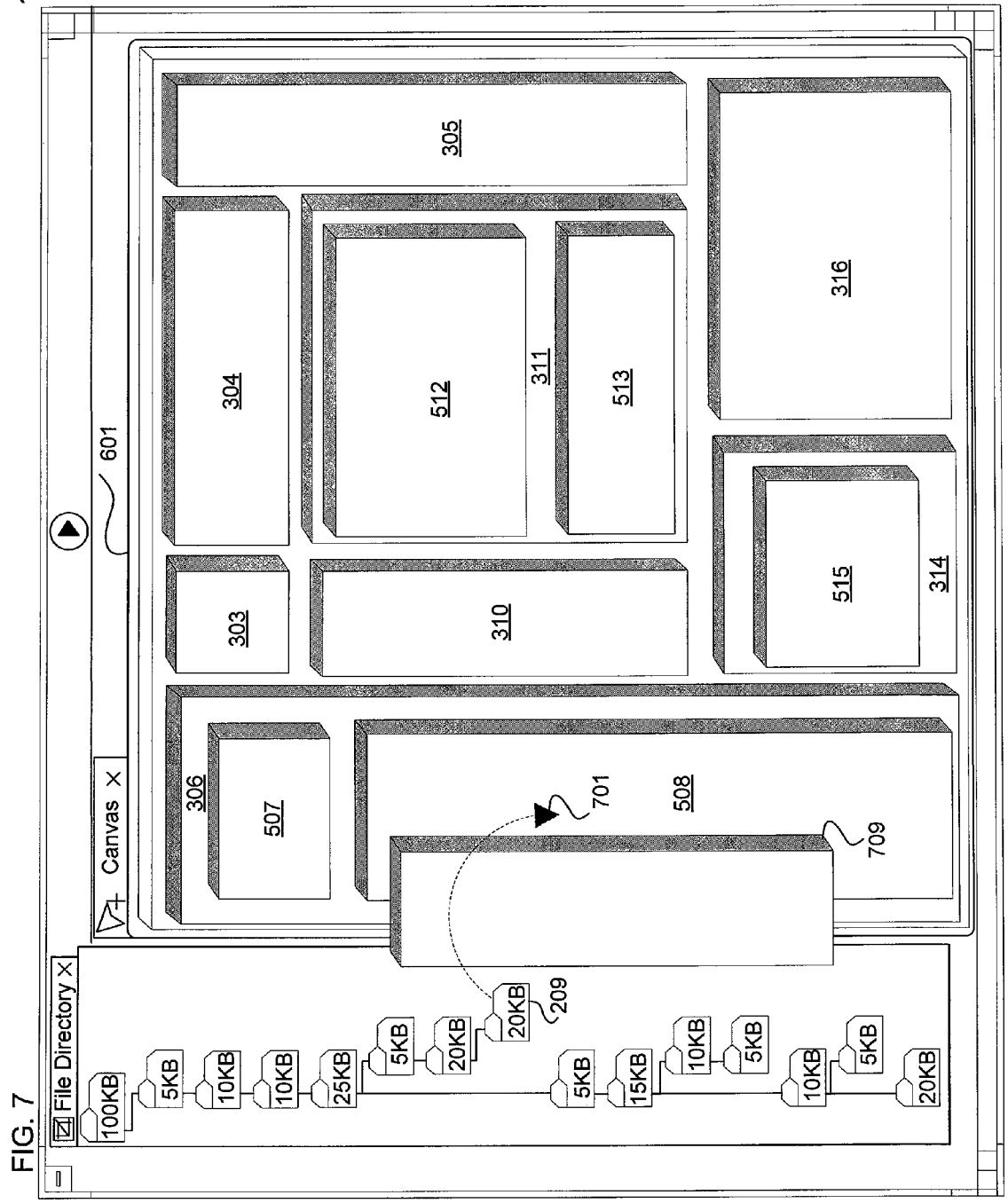
FIG. 7 is a diagram of a tree-map display, according to an example embodiment, illustrating the addition of a third level node to a three-dimensional tree map.

FIG. 7 is a diagram of an example tree-map display 107 illustrating the addition of a third level node to the three-dimensional tree map 601. Shown is a transitional animation 701 that is used to illustrate the conversion of the file 209 into the 3D rectangle 709. This 3D rectangle 709 is nested within the 3D rectangle 508 based upon the tree-structured data as illustrated by the file directory 201 of FIG. 2.

Figure 8:
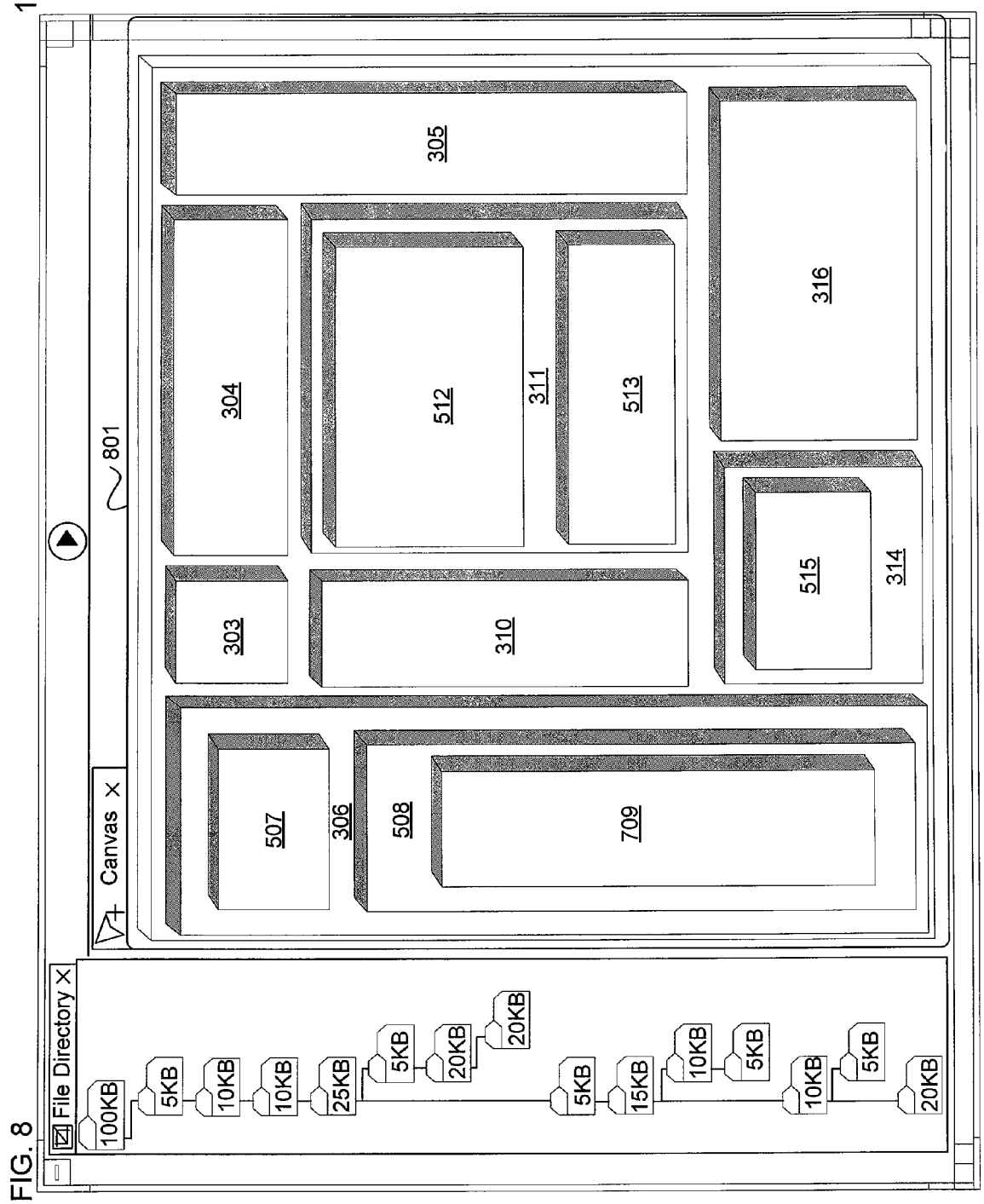
FIG. 8 is a diagram of tree-map display, according to an example embodiment, illustrating a three-dimensional tree map that includes first, second and third level nodes.

FIG. 8 is an example tree-map display 107 illustrating a three-dimensional tree-map that includes first, second, and third level nodes. Shown is a three-dimensional tree-map 801 that includes 3D rectangles 709, 508, 306 and 507. Further, 3D rectangles 303, 304, 310, 510, 311, 513, 515, 314, 316 and 305 are shown. Through the use of a tree-map algorithm, these various 3D rectangles may be nested and a final height, width, and X and Y coordinate values for each of these 3D rectangles are determined. Nesting is represented at, for example, 3D rectangle 311 where 3D rectangle 512 and 3D rectangle 513 are nested within 3D rectangle 311. A further example of nesting is illustrated by 3D rectangle 314 that has nested within it a 3D rectangle 515. Further, 3D rectangle 306 has nested within it 3D rectangles 507 and 508. Nested within 3D rectangle 508 is 3D rectangle 709. The 3D rectangle 709 is a third level node, whereas a 3D rectangle 508 is a second level node and the 3D rectangle 306 is a first level node. Similarly, 3D rectangle 515 is a second level node and 3D rectangle 314 is a first level node. Additionally, 3D rectangles 512 and 513 are second level nodes whereas 3D rectangle 311 is a first level node.

Figure 9:
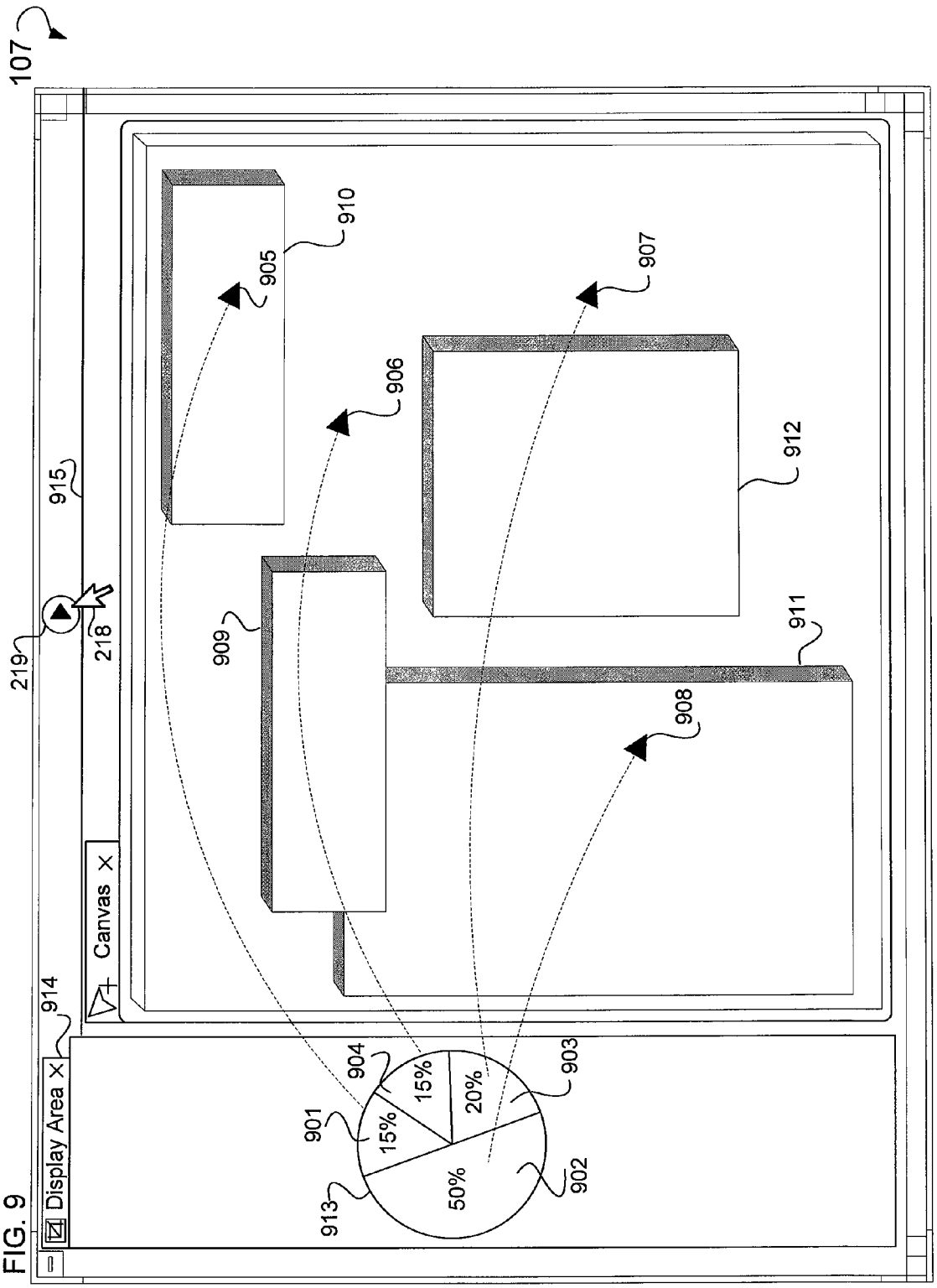
FIG. 9 is a diagram of a tree-map display, according to an example embodiment, illustrating a pie chart that is used as structured hierarchical data to generate a three-dimensional tree map using a transitional animation.

FIG. 9 is an example tree-map display 107 illustrating structured data in the form of a pie chart used to generate a three-dimensional tree-map using a transitional animation. Shown is a tree-map display 107 that includes a display area 914, and a further display area 915 in the form of a canvas. Residing within the display area 914 is a pie chart 913 that is subdivided into portions 901 through 904. Using transitional animations 905 through 908, these various portions 901 through 904 are converted into 3D rectangles that are ultimately rendered as 3D rectangles within a three-dimensional tree map. For example, shown is the portion 901 that is converted into a 3D rectangle 910 using the transitional animation 905. Further, the portion 904 is converted into the 3D rectangle 909 using the transitional animation 906. Additionally, the portion 903 is converted into the 3D rectangle 912 using the transitional animation 907. Further, the portion 902 is converted into the 3D rectangle 911 using the transitional animation 908. As illustrated in FIG. 2, additional 3D rectangles may be utilized to illustrate the transitional animations 905 through 908.

Figure 10:
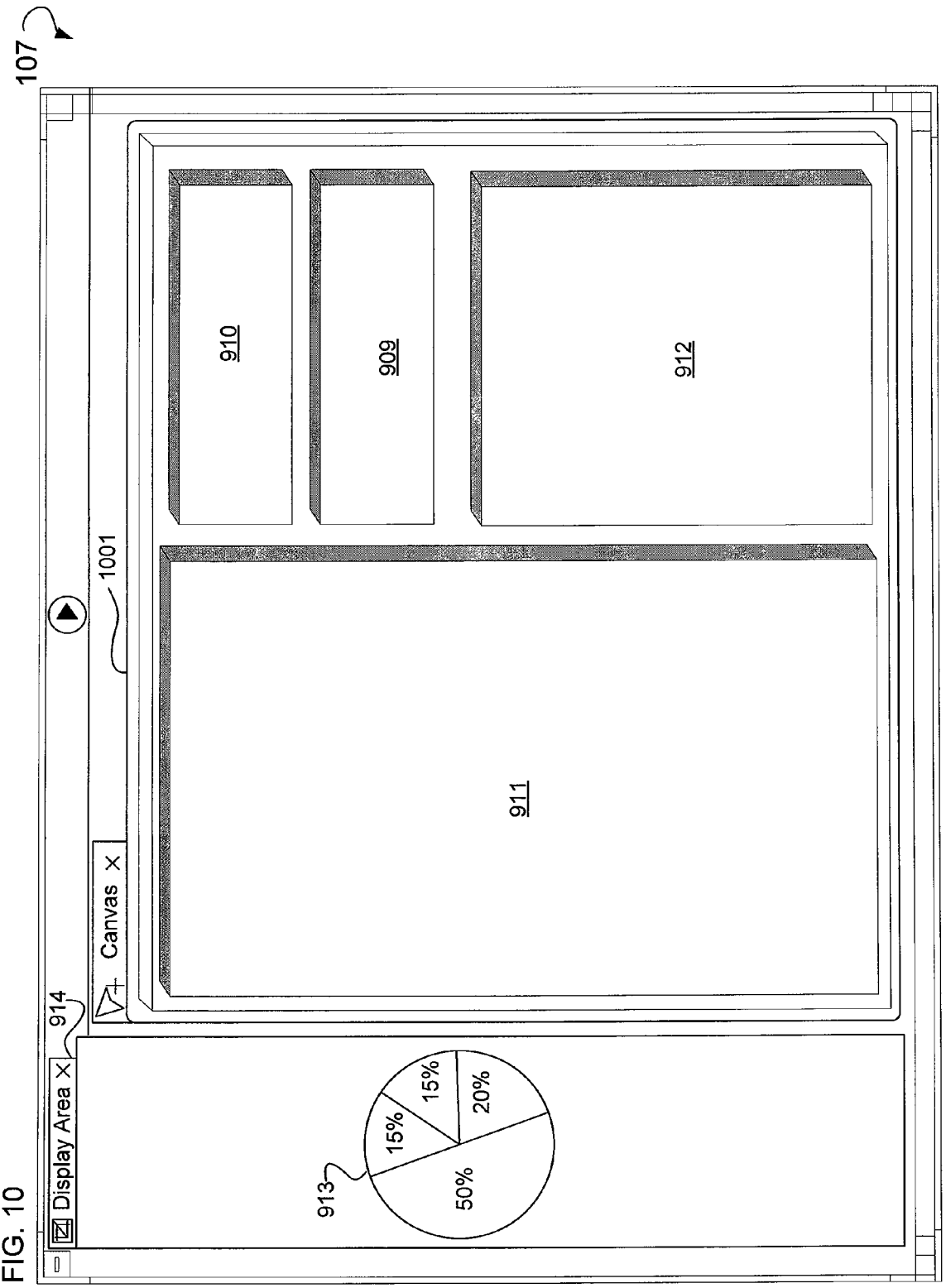
FIG. 10 is a diagram of a tree-map display, according to an example embodiment, illustrating a three-dimensional tree map representation of the pie chart.

FIG. 10 is a diagram of an example tree-map display 107 illustrating a three-dimensional tree-map representation of a pie chart. Shown is a three-dimensional tree-map 1001 that includes the previously illustrated 3D rectangles 909 through 912. These 3D rectangles 909 through 912 represent first level nodes of the three-dimensional tree map 1001.

Figure 11:
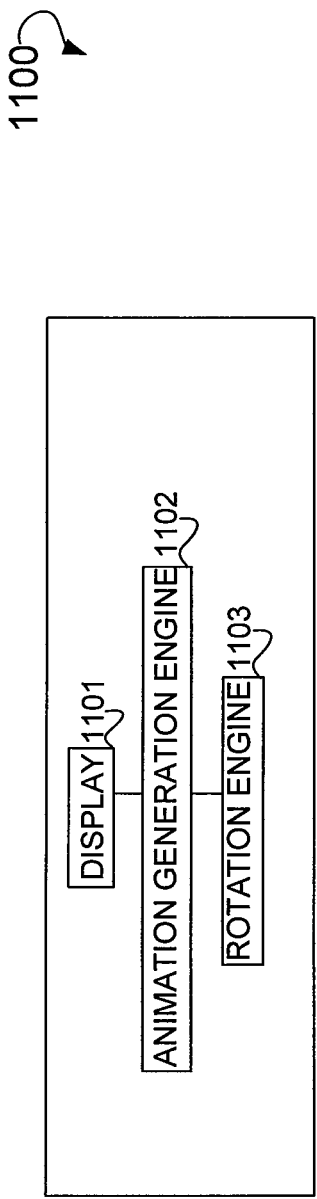
FIG. 11 is a block diagram of a computer system, according to an example embodiment, used to generate a tree-map request and to generate a transitional animation for a three-dimensional tree map.

FIG. 11 is a block diagram of an example computer system 1100 used to generate a tree-map request and to generate a first transitional animation for a three-dimensional tree map. The blocks shown herein may be implemented in software, firmware, or hardware. These blocks may be directly or indirectly communicatively coupled via a physical or logical connection. The computer system 1100 may be the devices 102 shown in FIG. 1. Shown are blocks 1101 through 1103. Illustrated is a display 1101 to display a two-dimensional tree representation of a hierarchical data structure. Communicatively coupled to the display 1101 is an animation generation engine 1102 to generate a first transitional animation that graphically represents a first portion of the two-dimensional tree representation of the hierarchical data structure as a sequence of three-dimensional parallelograms, the sequence to be displayed between a first location with respect to the two-dimensional tree representation and a second location with respect to a three-dimensional tree representation of the hierarchical data structure. Communicatively coupled to the animation generation engine 1102 is the display 1101 to display a final form three-dimensional parallelogram included in the sequence of three-dimensional parallelograms at the second location with respect to the three-dimensional tree representation of the hierarchical data structure. In some example embodiments, the animation generation engine 1102 generates the first transitional animation and applies a tree-mapping algorithm to the graphically represented first portion of the two dimensional tree representation of the hierarchical data structure. In some example embodiments, the tree-mapping algorithm includes at least one of a binary tree-map algorithm, an ordered tree-map algorithm, a slice-and-dice tree-map algorithm, a squarified tree-map algorithm, or a strip tree-map algorithm. In some example embodiments, the animation generation engine 1102 applies the tree-map algorithm to the first portion of the two-dimensional tree representation of the hierarchical data structure to generate the final form three-dimensional parallelogram, the final form including at least one of a final height value, a final width value, a final X coordinate value, or a final Y coordinate value.

In some example embodiments, the animation generation engine 1102 generates the final form parallelogram through adjusting a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate. Further, in some example embodiments, the animation generation engine 1102 adjusts at least one three-dimensional parallelogram, included in the sequence of three-dimensional parallelograms, to approximate the final form of the three dimensional parallelogram. Additionally, in some example embodiments, the adjustment includes at least one of decrementing or incrementing a height value, a width value, an X coordinate value, or a Y coordinate value of the at least one three-dimensional parallelogram. Moreover, in some example embodiments, the at least one three-dimensional parallelogram, included in the sequence of three-dimensional parallelograms, has at least one of a different height value, different width value, different X coordinate value, or different Y coordinate value as compared to another three-dimensional parallelogram included in the sequence of three-dimensional parallelograms. In some example embodiments, the final form three-dimensional parallelogram includes at least one of a cube or a cuboid. Communicatively coupled to the animation generation engine 1102 is a rotation engine 1103 to rotate the at least one three-dimensional parallelogram along at least one of an X axis or a Y axis.

Figure 12:
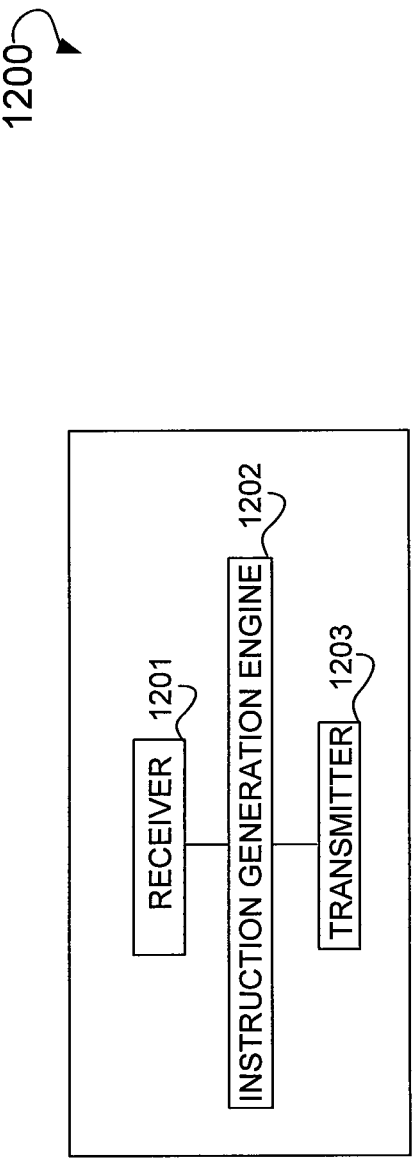
FIG. 12 is a block diagram of a computer system, according to an example embodiment, used to generate a tree-map rendering script.

FIG. 12 is a block diagram of an example computer system 1200 used to generate a tree-map rendering script. The blocks shown herein may be implemented in software, firmware, or hardware. These blocks may be directly or indirectly communicatively coupled via a physical or logical connection. The computer system 1200 may be the tree-map server 113 shown in FIG. 1. Shown are blocks 1201 through 1203. Illustrated is a receiver 1201 to receive a tree-map request that identifies a first portion of graphically represented tree-structured data to be translated into a sequence of three-dimensional parallelograms. Communicatively coupled to the receiver 1201 is an instruction generation engine 1202 to generate instructions used to translate the first portion of graphically represented tree-structured data into the sequence of three-dimensional parallelograms through applying a tree-map algorithm to the first portion of graphically represented tree-structured data. Communicatively coupled to the instruction generation engine 1202 is a transmitter 1203 to transmit the instructions as a tree-map rendering script that is used to render the sequence of three-dimensional parallelograms in a display area. In some example embodiments, the translation of the first portion of graphically represented tree-structured data into the sequence of three-dimensional parallelograms includes generating at least one of a final height value, a final width value, a final X coordinate, or a final Y coordinate. In some example embodiments, the rending script used to render the sequence of three-dimensional parallelograms includes an instruction to adjust a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate. Further, in some example embodiments, the instruction to adjust includes at least one of an instruction to decrement or an instruction to increment a height value, a width value, an X coordinate value, or a Y coordinate value of the at least one three-dimensional parallelogram. The instructions of the rendering script may be written in a language including at least one of ACTIONSCRIPT™, PERL™, VBSCRIPT™, JAVA™, JAVASCRIPT™, XML, or MXML.

Figure 13:
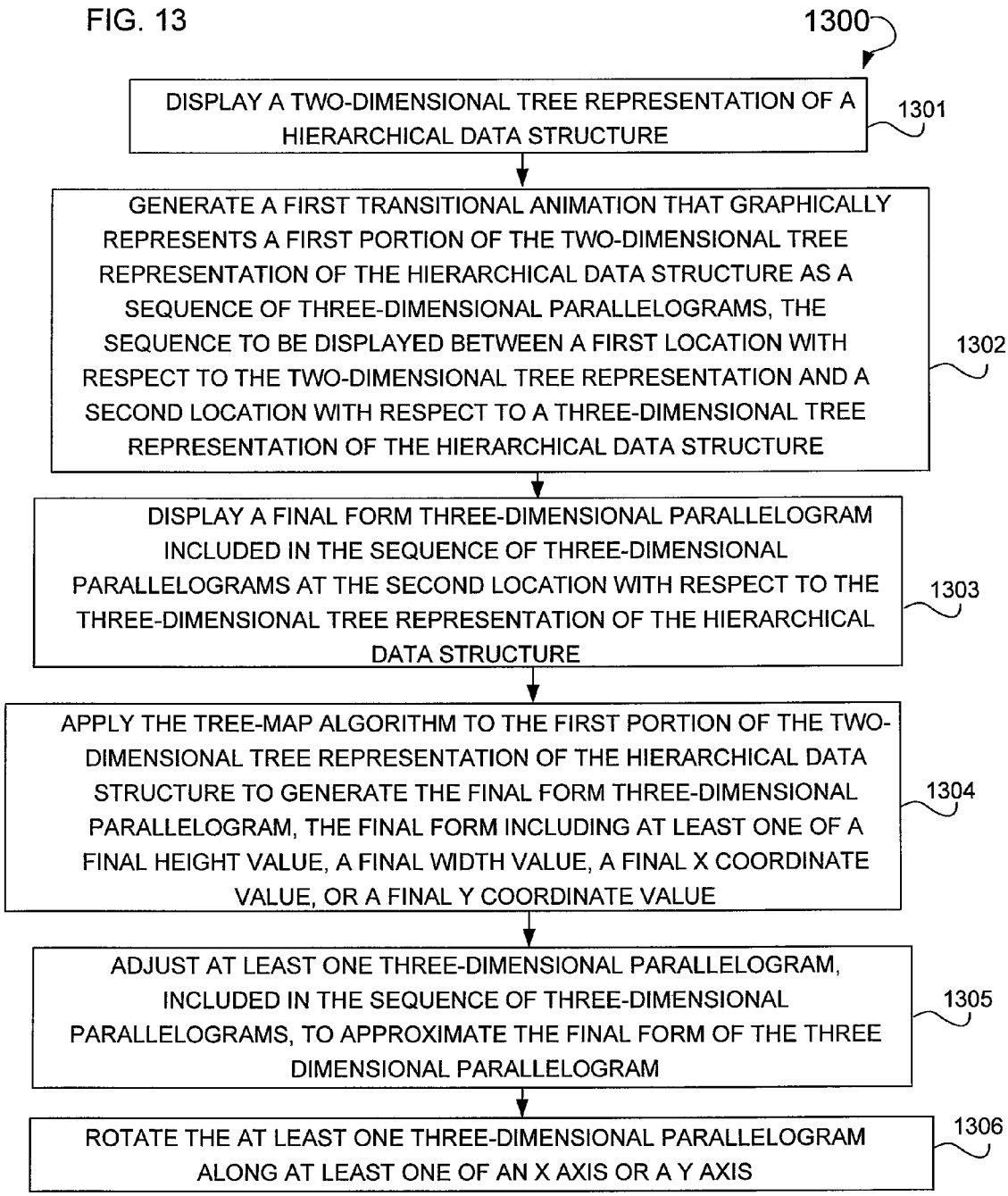
FIG. 13 is a flow chart illustrating a method, according to an example embodiment, used to generate a tree-map request and to generate a transitional animation for a three-dimensional tree map.

FIG. 13 is a flow chart illustrating an example method 1300 used to generate a tree-map request and to generate a first transitional animation for a three-dimensional tree map. Shown are various operations 1301 through 1305 that may be executed on the devices 102 shown in FIG. 1. An operation 1301 is shown that is executed by the display 1101 to displaying a two-dimensional tree representation of a hierarchical data structure. An operation 1302 is executed by a animation generation engine 1102 to generate a first transitional animation that graphically represents a first portion of the two-dimensional tree representation of the hierarchical data structure as a sequence of three-dimensional parallelograms, the sequence to be displayed between a first location with respect to the two-dimensional tree representation and a second location with respect to the three-dimensional tree representation of the hierarchical data structure. An operation 1303 is executed by the display 1101 to display a final form three-dimensional parallelogram included in the sequence of three-dimensional parallelograms at the second location with respect to the three-dimensional tree representation of the hierarchical data structure. In some example embodiments, the generating of the first transitional animation includes applying a tree-mapping algorithm to the graphically represented first portion of the three-dimensional tree representation of the hierarchical data structure. In some example embodiments, the tree-mapping algorithm includes at least one of a binary tree-map algorithm, an ordered tree-map algorithm, a slice-and-dice tree-map algorithm, a squarified tree-map algorithm, or a strip tree-map algorithm. Operation 1304 is executed by the animation generation engine 1102 to apply the tree-map algorithm to the first portion of the two-dimensional tree representation of the hierarchical data structure to generate the final form three-dimensional parallelogram, the final form including at least one of a final height value, a final width value, a final X coordinate value, or a final Y coordinate value.

In some example embodiments, the generation of the final form parallelogram includes adjusting a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate. Operation 1305 is executed by the animation generation engine 1102 to adjust at least one three-dimensional parallelogram, included in the sequence of three-dimensional parallelograms, to approximate the final form of the three dimensional parallelogram. In some example embodiments, the adjusting includes at least one of decrementing or incrementing a height value, a width value, an X coordinate value, or a Y coordinate value of the at least one three-dimensional parallelogram. In some example embodiments, the at least one three-dimensional parallelogram, included in the sequence of three-dimensional parallelograms, has at least one of a different height value, different width value, different X coordinate value, or different Y coordinate value as compared to another three-dimensional parallelogram included in the sequence of three-dimensional parallelograms. In some example embodiments, the final form three-dimensional parallelogram includes at least one of a cube or a cuboid. Operation 1306 is executed by the rotation engine 1103 to rotate the at least one three-dimensional parallelogram along at least one of an X axis or a Y axis.

Figure 14:
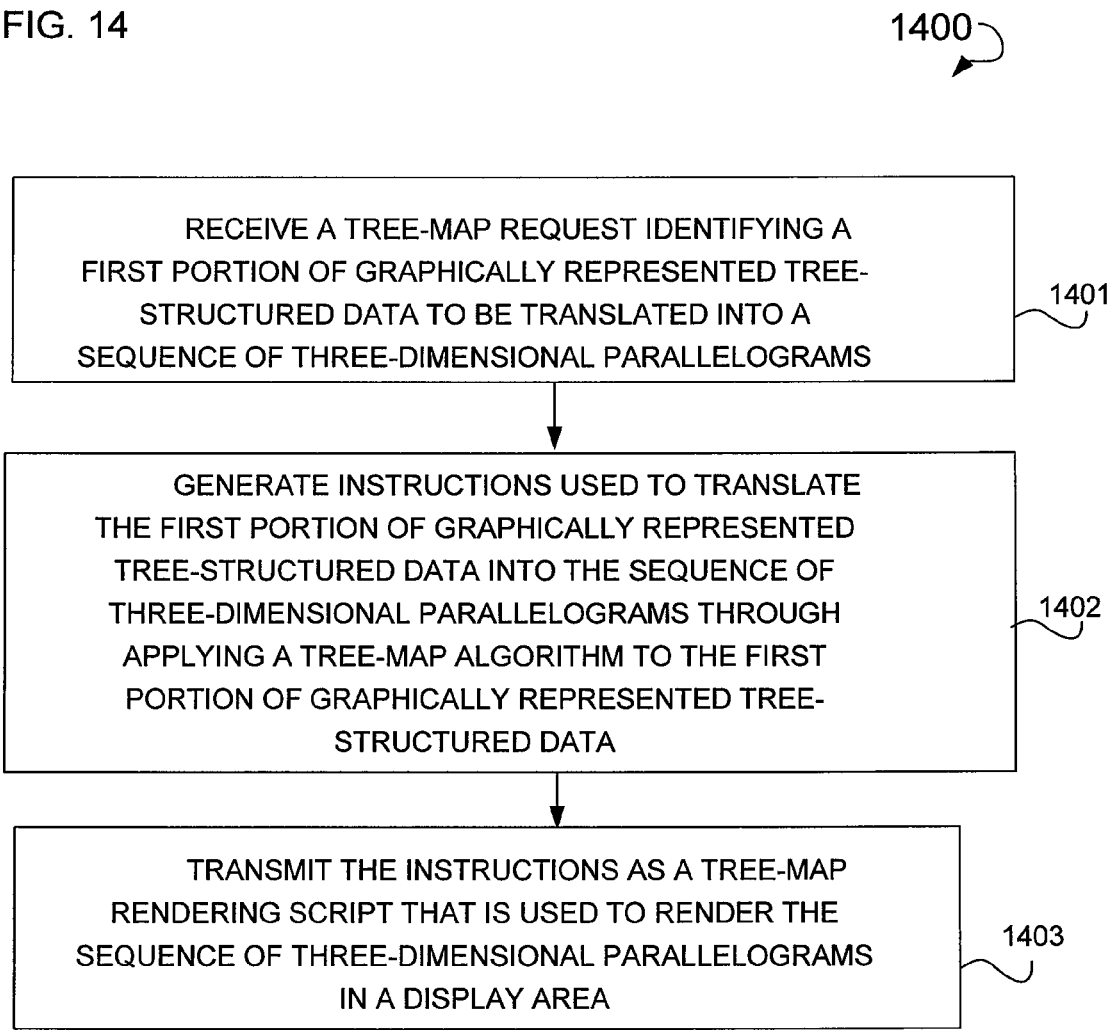
FIG. 14 is a flow chart illustrating a method, according to an example embodiment, used to generate a tree-map rendering script.

FIG. 14 is a flow chart illustrating an example method 1400 used to generate a rendering script. Shown are various operations 1401 through 1403 that may be executed on the tree-map server 113 shown in FIG. 1. Shown is an operation 1401, that is executed by the receiver 1201 shown in FIG. 12, to receive a tree-map request identifying a first portion of graphically represented tree-structured data to be translated into a sequence of three-dimensional parallelograms. Operation 1402 is executed by the instruction generation engine 1202 to generate instructions used to translate the first portion of graphically represented tree-structured data into the sequence of three-dimensional parallelograms through applying a tree-map algorithm to the first portion of graphically represented tree-structured data. Operation 1403 is executed by the transmitter 1203 to transmit the instructions as a tree-map rendering script that is used to render the sequence of three-dimensional parallelograms in a display area. In some example embodiments, the translation of the first portion of graphically represented tree-structured data into the sequence of three-dimensional parallelograms includes generating at least one of a final height value, a final width value, a final X coordinate, or a final Y coordinate. In some example embodiments, the rending script used to render the sequence of three-dimensional parallelograms includes an instruction to adjust a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate. Further, in some example embodiments, the instruction to adjust includes at least one of an instruction to decrement or an instruction to increment a height value, a width value, an X coordinate value, or a Y coordinate value of the at least one three-dimensional parallelogram.

Figure 15:
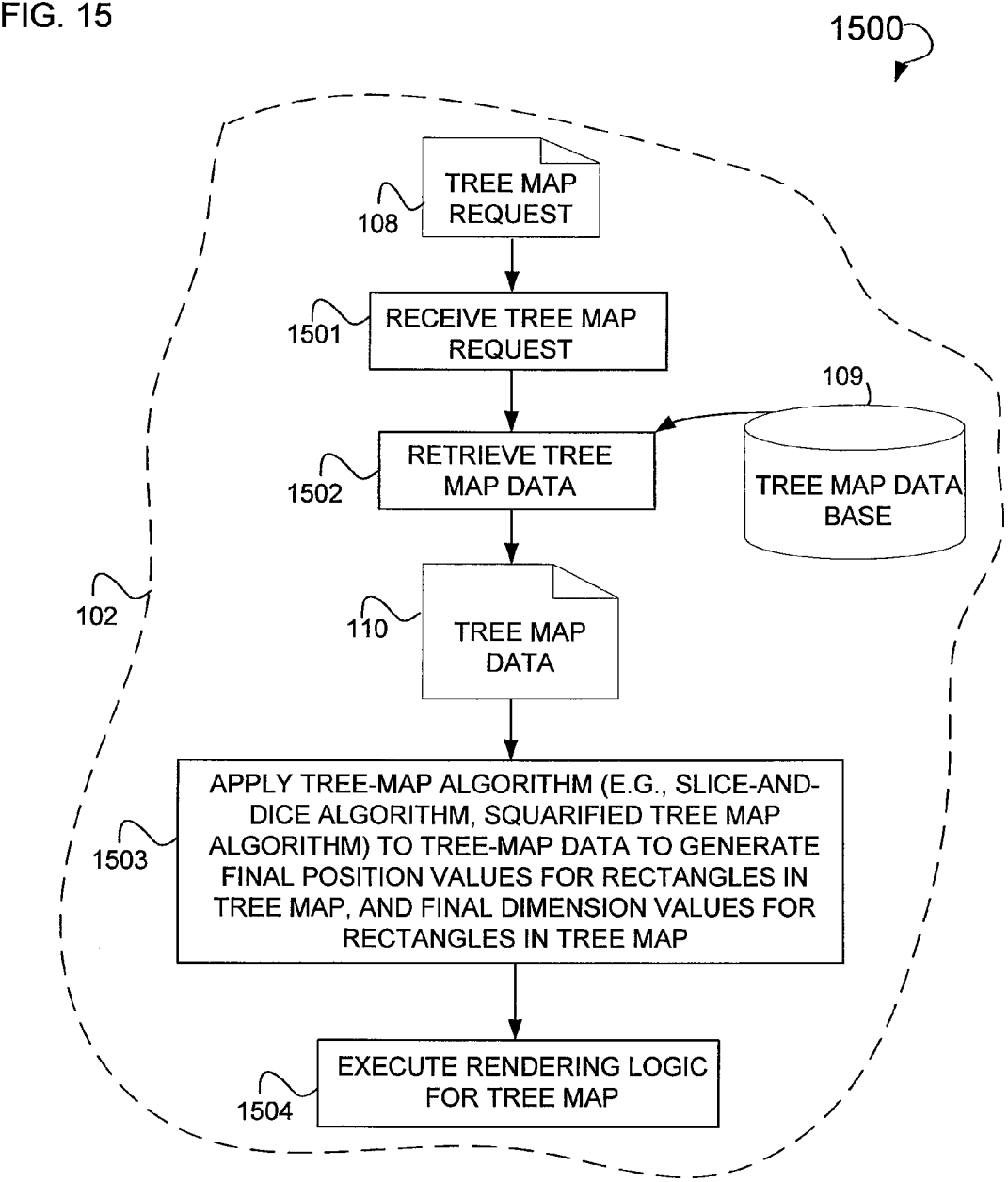
FIG. 15 is a flow chart illustrating a method, according to an example embodiment, used to generate a three-dimensional tree map using a transitional animation.

FIG. 15 is a flow chart illustrating an example method 1500 used to generate a three-dimensional tree map using a transitional animation. Shown are various operations 1501 through 1504 that maybe executed by one of the devices 102. Illustrated is the tree-map request 108 that is received through the execution of operation 1501. An operation 1502 is executed that retrieves tree-map data from the previously illustrated tree-map database 109. This tree-map data 110 is processed by an operation 1505 that applies a tree-map algorithm to the tree-map data 110. An operation 1504 is executed to implement rendering logic (e.g., instructions used to render) for the tree map. This rendering logic, as will be more fully illustrated below, includes the use of the previously illustrated transitional animations to display the conversion of structured data (e.g., files 202-216) into 3D rectangles that are adjusted for height, width, and X and Y coordinates based upon the final height, width and X and Y coordinates generated via the tree-map algorithm applied at operation 1503. In some example embodiments, operations 1503 and 1504 are executed by the animation generation engine 1102.

Figure 16:
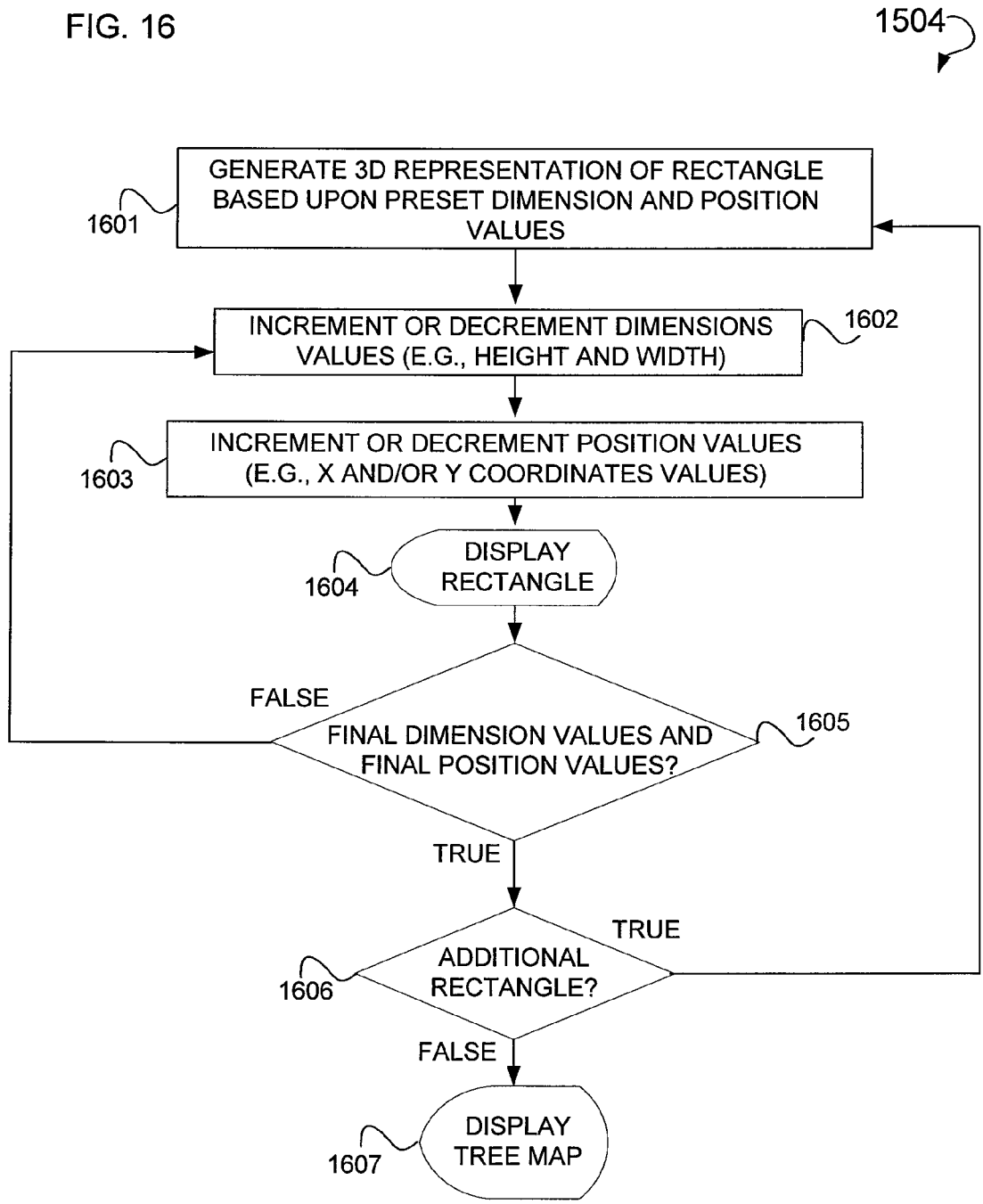
FIG. 16 is a flow chart illustrating the execution of an operation, according to an example embodiment, to implement rendering logic and associated instructions for a tree map.

FIG. 16 is a flow chart illustrating the execution of an example operation 1504. Shown is an operation 1601 that generates a three-dimensional representation of a 3D rectangle based upon certain preset dimension and coordinate values. These preset dimension values correspond to height and width, whereas the preset coordinate values correspond to X and Y coordinate values within the display area 217 of FIG. 2. These presets may be determined by a user, or may include certain default values that are automatically applied by, for example, a computer system.

An operation 1602 is also shown that increments or decrements dimension values. These dimensions include as previously illustrated height and width. Further, an operation 1603 is executed that increments or decrements X or Y coordinate values. Further, an operation 1604 is executed that displays a 3D rectangle that is a part of a three-dimensional tree map.

A decisional operation 1605 is executed that determines whether or not final dimension values and final coordinate values have been met by the incrementing or decrementing of the dimension values and/or the coordinate values. In examples where decisional operation 1605 evaluates to "false," the operation 1602 is re-executed. In examples where the decisional operation 1605 evaluates to "true," a further decisional operation 1606 is executed. Decisional operation 1606 determines whether there are additional 3D rectangles to be generated for the purposes of rendering the three-dimensional tree map. In examples where decisional operation 1606 evaluates to "true," the operation 1601 is re-executed. In cases where decisional operation 1606 evaluates to "false," an operation 1607 is executed that displays the three-dimensional tree map (see e.g. three-dimensional tree-map 801 of FIG. 8 or three-dimensional tree map 1001 of FIG. 10).

Figure 17:
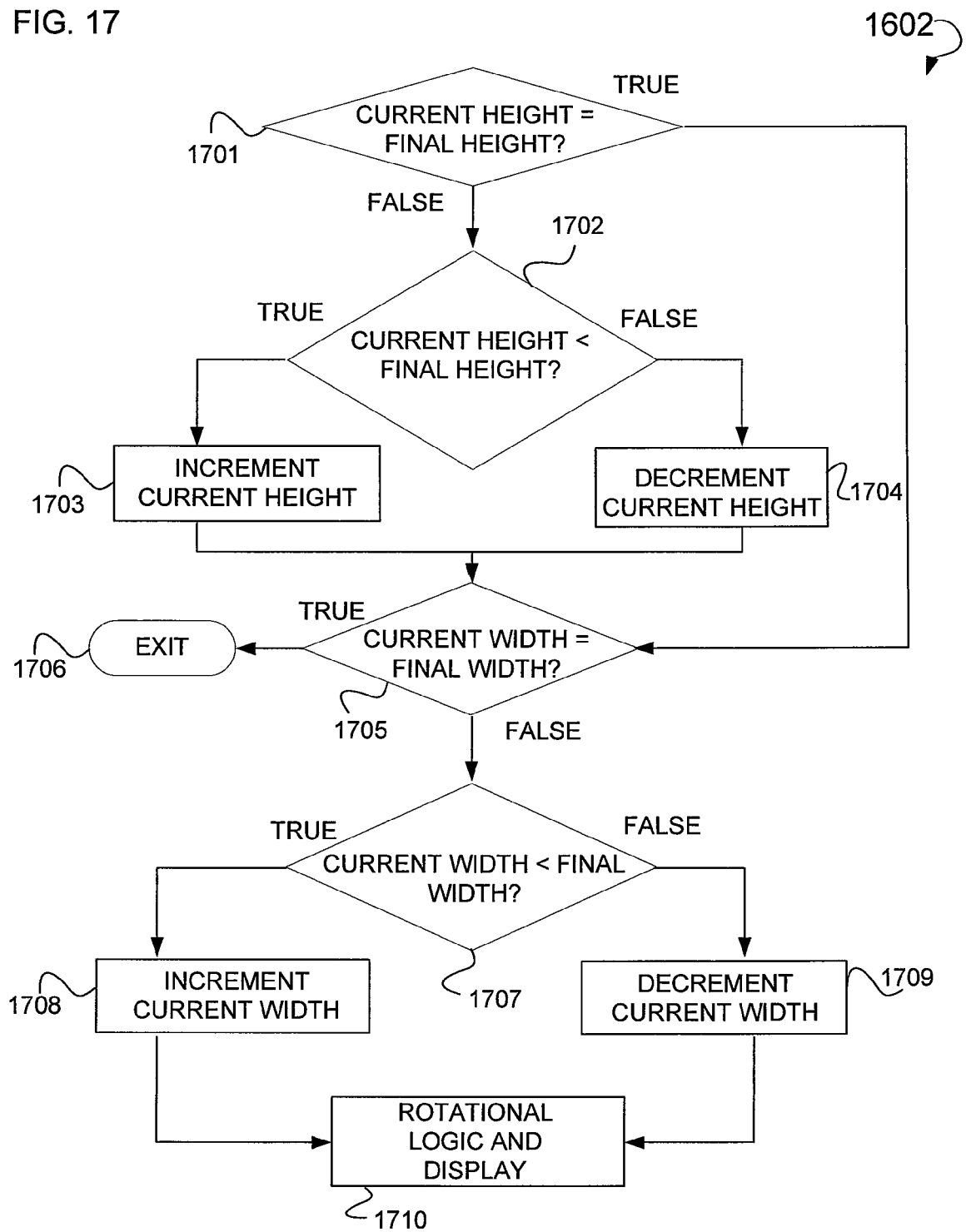
FIG. 17 is a flow chart illustrating the execution of an operation, according to an example embodiment, that increments or decrements dimension values.

FIG. 17 is a flow chart illustrating the execution of an example operation 1602. As a threshold matter, dimensional values include a height value, width value, X value, or a Y value of a 3D rectangle. Shown is a decisional operation 1701 that determines whether or not the current height of a 3D rectangle is equal to the final height of a 3D rectangle as defined by the tree-map algorithm. In examples where decisional operation 1701 evaluates to "false," a further decisional operation 1702 is executed. In cases where a decisional operation 1701 evaluates to "true," a further decisional operation 1705 is executed. In cases where decisional operation 1702 is executed, decisional operation 1702 determines whether or not the current height is less than the final height of a 3D rectangle. In cases where decisional operation 1702 evaluates to "true," an operation 1703 is executed. In cases where decisional operation 1702 evaluates to "false," an operation 1704 is executed. In cases where operation 1703 is executed, the current height of the 3D rectangle is incremented. In cases where operation 1704 is executed, the current height of the 3D rectangle is decremented.

The value by which the current height is incremented or decremented may be preset by a user, or set via an auto-default value dictated by a computer system. Decisional operation 1705, when executed, determines whether or not the current width equals a final width. In cases where a decisional operation 1705 evaluates to "true," a termination operation 1706 is executed. In cases where a decisional operation 1705 evaluates to "false," a further decisional operation 1707 is executed. Decisional operation 1707 determines whether or not the current width is less than a final width. In cases where decisional operation 1707 evaluates to "true," an operation 1708 is executed. In cases where decision operation 1707 evaluates to "false," an operation 1709 is executed. In cases where operation 1708 is executed, the current width value of a 3D rectangle is incremented. In cases where operation 1709 is executed, the current width value of a 3D rectangle is decremented. The value by which the current width is incremented or decremented may be preset by a user, or may be based upon an auto-default value provided by a computer system. Operation 1710 is executed to execute rotational logic and to display the results of the execution of the rotational logic. Operations 1703, 1704, 1708, and 1709 facilitate the approximation of the final form of a 3D rectangle.

Figure 18:
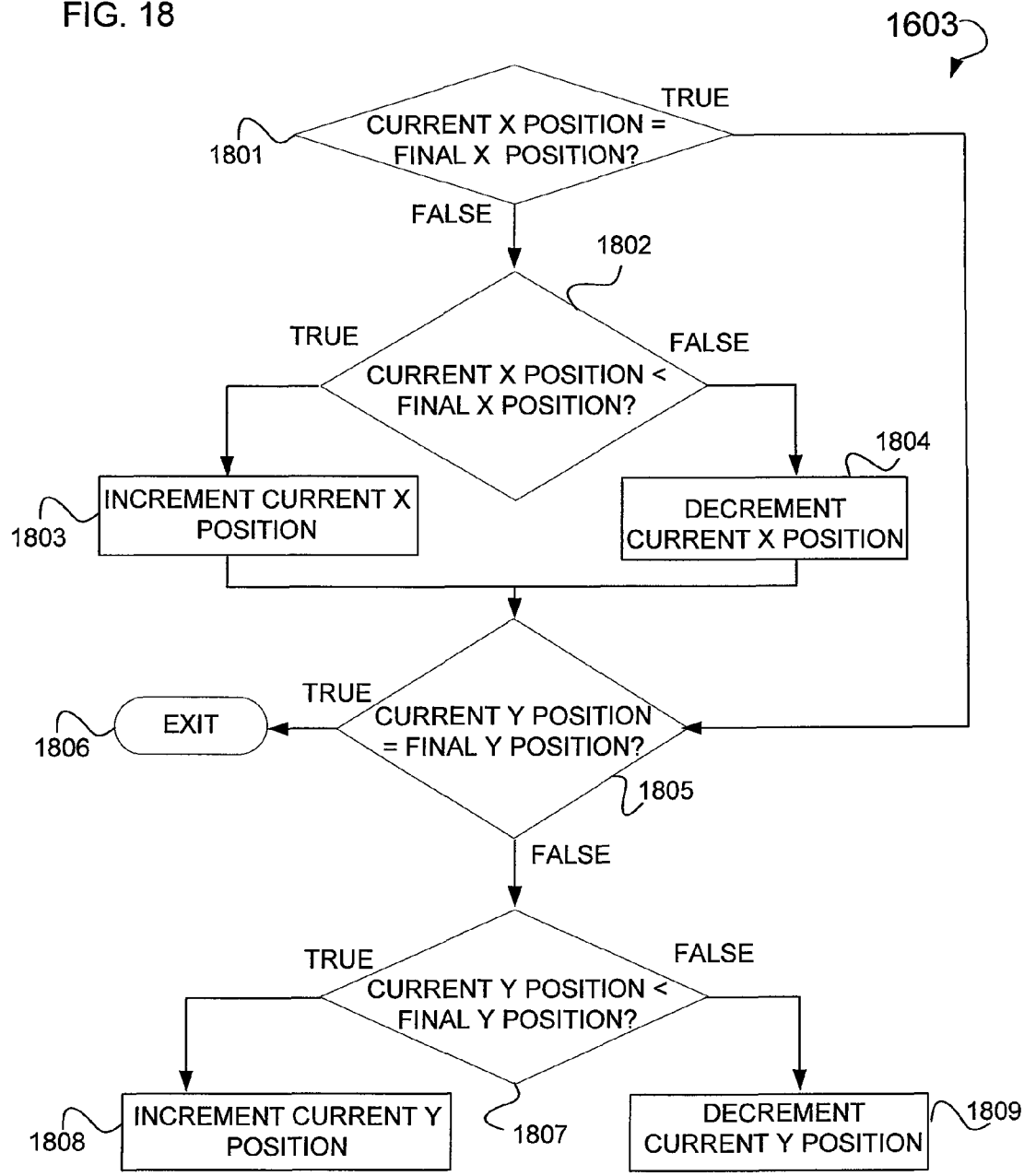
FIG. 18 is a flow chart illustrating the execution of an operation, according to an example embodiment, that increments or decrements values such as X or Y coordinate values.

FIG. 18 is a flow chart illustrating the execution of an example operation 1603. Shown is a decisional operation 1801 that determines whether or not a current X coordinate equals a final X coordinate. In cases where decisional operation 1801 evaluates to "false," a decisional operation 1802 is executed. In cases where a decisional operation 1801 evaluates to "true," a decisional operation 1805 is executed. In cases where a decisional operation 1802 is executed, a determination is made as to whether the current X coordinate is less than the final X coordinate. In cases where decisional operation 1802 evaluates to "true," the current X coordinate is incremented through the execution of operation 1803. In cases where decisional operation 1802 evaluates to "false," the current X coordinate is decremented based upon the execution of operation 1804.

Decisional operation 1805 is executed to determine whether or not the current Y coordinate is equal to a final Y coordinate. In cases where a decisional operation 1805 evaluates to "true," a termination operation 1806 is executed. In cases where a decisional operation 1805 evaluates to "false," a decisional operation 1807 is executed. Decisional operation 1807 determines whether the current Y coordinate value is less than the final Y coordinate value. In cases where decisional operation 1807 evaluates to "true," an operation 1808 is executed. In cases where decisional operation 1807 evaluates to "false," an operation 1809 is executed.

Operation 1808 increments a current Y coordinate value using a value preset by a user, or via an automatic default value determined by a computer system. Operation 1809 is executed a decrement a current Y coordinate value. The value by which this current Y coordinate is decremented maybe preset by a user or set via an auto default implemented by a computer system. Operations 1803, 1804, 1808, and 1809 facilitate the approximation of the final form of a 3D rectangle.

Figure 19:
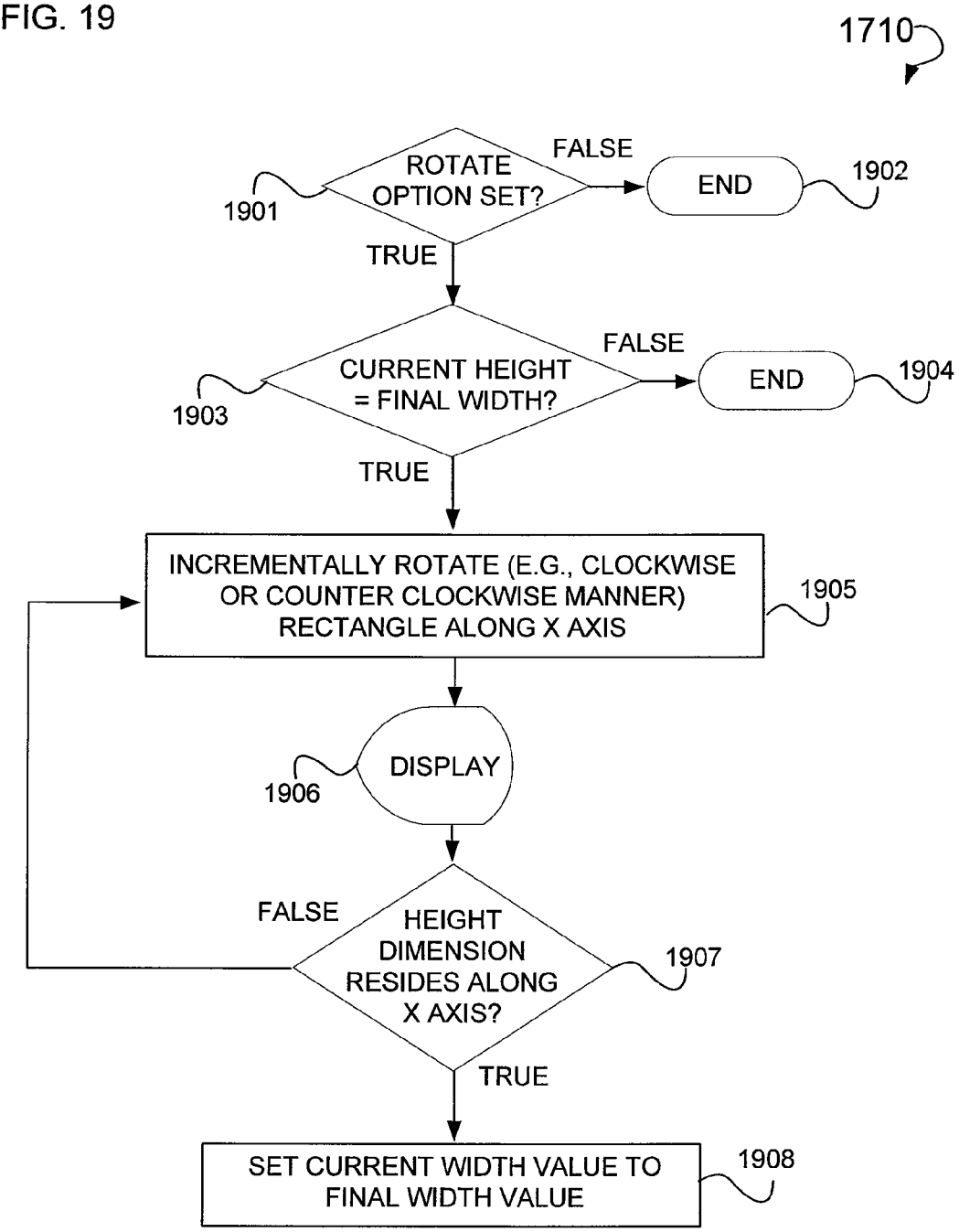
FIG. 19 is a flow chart illustrating the execution of an operation, according to an example embodiment, to execute rotational logic and to display the results of the execution of the rotational logic along an X-axis.

FIG. 19 is a flow chart illustrating the execution of an example operation 1710. Shown is a decisional operation 1901 that determines whether a rotate option has been set. This rotation option may set a boolean based flag. In cases where decisional operation 1901 evaluates to "false," a termination operation 1902 is executed. In cases where decisional operation 1901 evaluates to "true," a further decisional operation 1903 is executed. Decisional operation 1903 determines whether the current height value equals the final width value. In cases where decisional operation 1903 evaluates to "false," a further termination operation 1904 is executed. In cases where decisional operation 1903 evaluates to "true," an operation 1905 is executed that incrementally rotates a 3D rectangle along a Y axis. In some example embodiments, operation 1710 is executed by the rotation engine 1103.

This incremental rotation may take the form of a clockwise or counter clockwise rotation. (See e.g. rotation 235 shown in FIG. 2). Increments may be in the form of pixel values. A display 1906 is executed to display this incremental rotation as implemented at operation 1905. A decisional operation 1907 is executed to determine whether the height dimension now resides along the X axis. In cases where a decisional operation 1907 evaluates to "false," the operation 1905 is re-executed. In cases where a decisional operation 1907 evaluates to "true," an operation 1908 is executed. Operation 1908 sets the current width value to the final width value.

Figure 20:
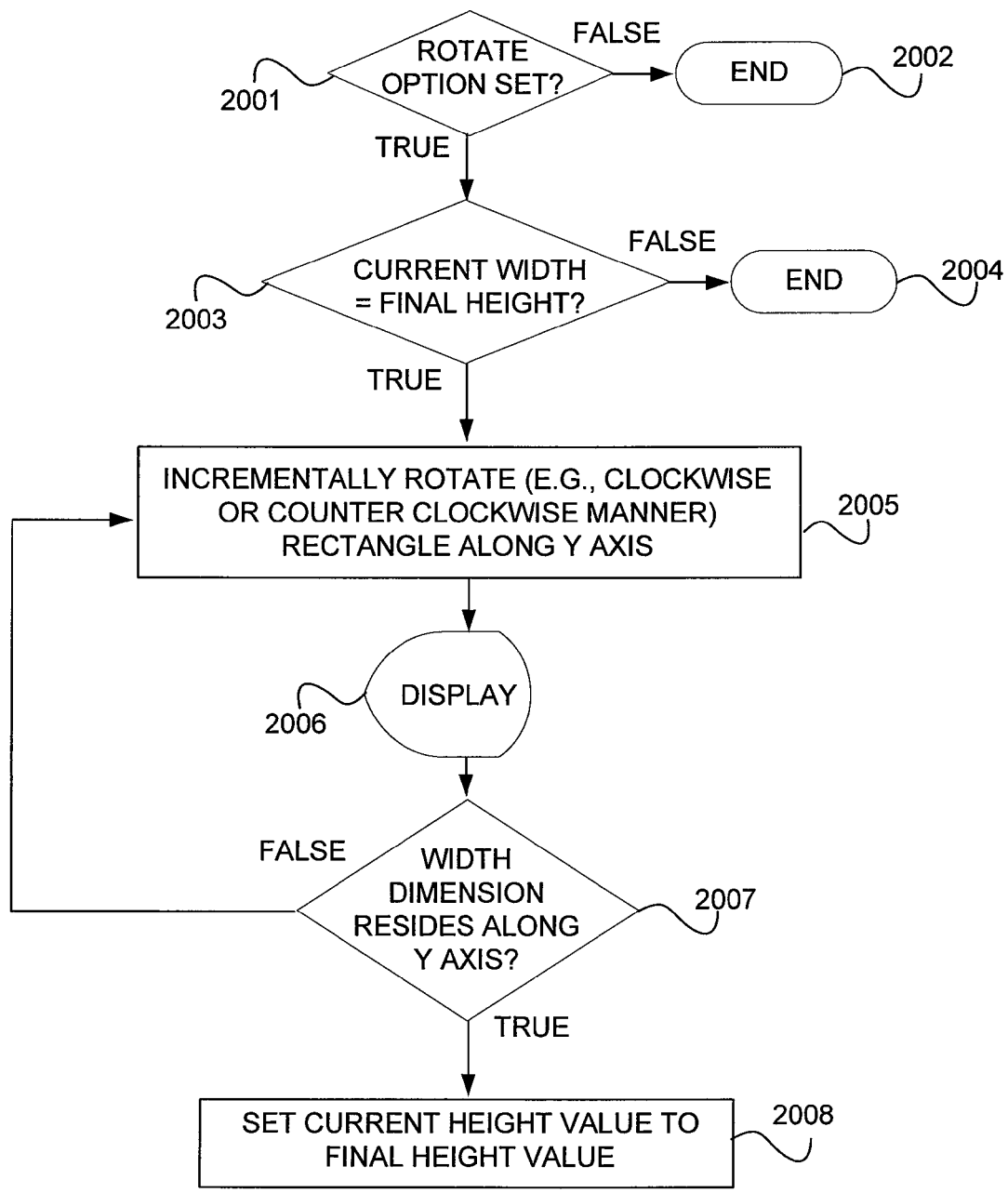
FIG. 20 is a flow chart illustrating the execution of an operation, according to an example embodiment, to execute rotational logic and to display the results of the execution of the rotational logic along a Y-axis.

FIG. 20 is a flow chart illustrating the execution of an example operation 1710. Shown is a decisional operation 2001 that determines whether or not a rotation option has been set. The rotation option may be set with a boolean based flag. In cases where a decisional operation 2001 evaluates to "false," a termination operation 2002 is executed. In cases where a decisional operation 2001 evaluates to "true," a decisional operation 2003 is executed that determines whether the current width equals the final height. In cases where decisional operation 2003 evaluates to "false," a termination operation 2004 is executed.

In cases where decisional operation 2003 evaluates to "true," an operation 2005 is executed that incrementally rotates a 3D rectangle along a Y axis. This incremental rotation may take the form of a clockwise or counter clockwise rotation. A display operation 2006 is executed to display this rotation. (See e.g., rotation 235 shown in FIG. 2). A decisional operation 2007 is executed that determines whether the width dimension resides along the Y axis. In cases where decisional operation 2007 evaluates to "false," the operation 2005 is re-executed. In cases where decisional operation 2007 evaluates to "true," an operation 2008 is executed that sets the current height value to the final height value.

Figure 21:
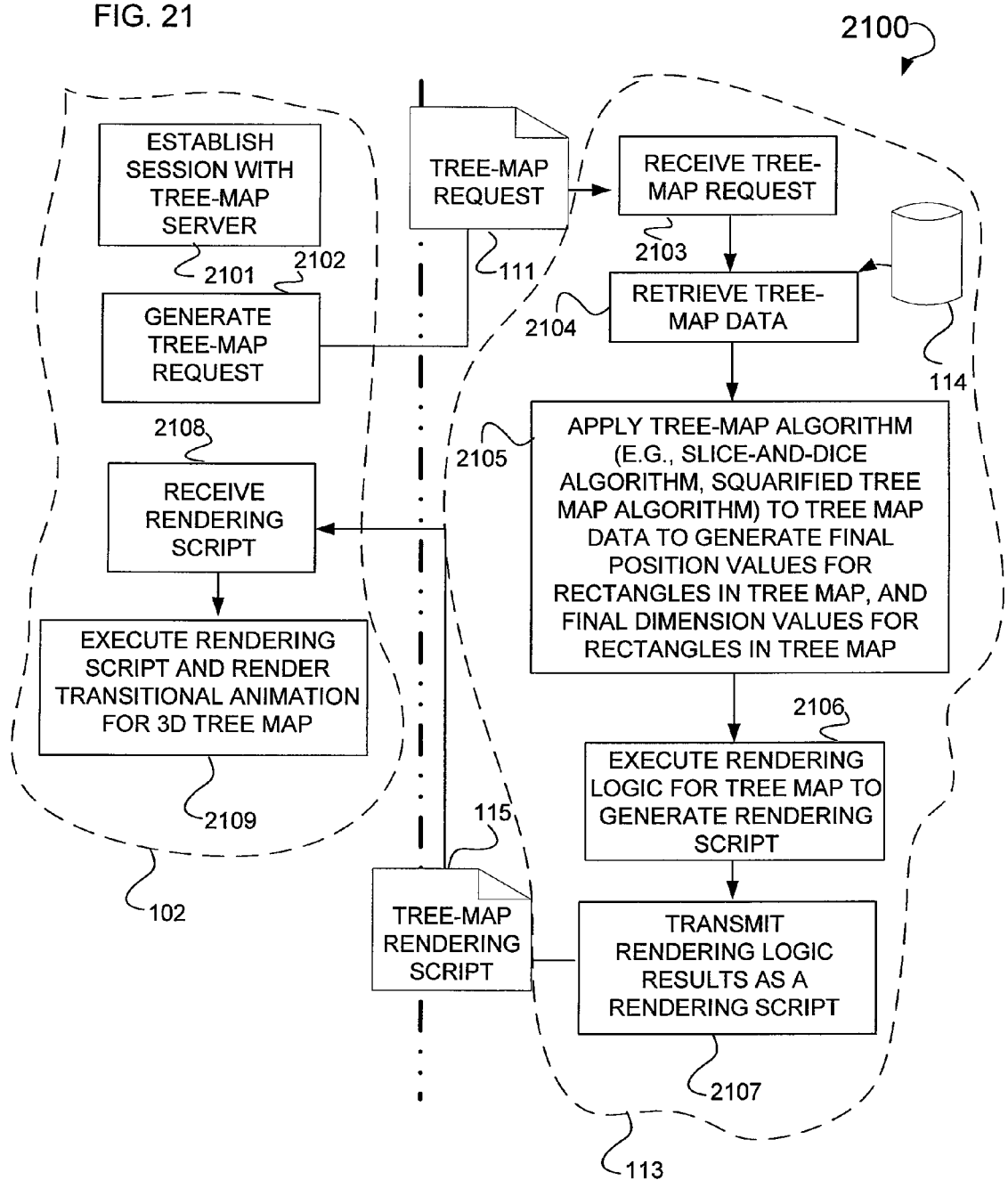
FIG. 21 is a dual-stream flow chart illustrating a method, according to an example embodiment, used to generate a tree-map request and to receive a tree-map rendering script.

FIG. 21 is a dual-stream flow chart illustrating an example method 2100 used to generate a tree-map request and to receive a tree-map rendering script. Shown are operations 2101, 2102, 2108 and 2109 that maybe executed by the one more devices 102. Further, shown are operations are 2103 through 2107 that maybe executed by the tree-map server 113. Illustrated is the operation 2101 that establishes a session between one or more of the devices 102 and the tree-map server 113. This session may take the form of a Transmission Control Protocol/Internet Protocol (TCP/IP) session, a login session, or some other suitable type session. An operation 2102 is executed that generates the tree-map request 111. This tree-map request 111 is received through the execution of operation 2103. Operation 2104 is executed that retrieves tree-map data from the tree-map database 114. In some example embodiments, operations 2104 through 2106 are executed by the instruction generation engine 1202.

Operation 2105 is executed that applies a tree-map algorithm to the tree-map data to generate final coordinate values for 3D rectangles in a tree-map and final dimension values for 3D rectangles in a tree-map where this tree-map is a three-dimensional tree map. (See e.g., three-dimensional tree-map 801 and three-dimensional tree-map 1001 shown in FIG. 10). Operation 2106 is executed to generate logic for a three dimensional tree-map that is stored as a tree-map rendering script 115. The tree-map rendering script 115, when executed, generates transitional animations used to create a three-dimensional tree map. Further, the tree-map rendering script 115 may include the final height, width, and X and Y coordinate values for each of the 3D rectangles used to generate the three-dimensional tree map. Operation 2107 is executed to transmit the tree-map rendering script 115 to the one or more devices 102. Operation 2108 is executed to receive the tree-map rendering script 115. Operation 2109 is executed to process or otherwise execute the tree-map rendering script for the purposes of generating a transitional animation for a rendered three-dimensional tree map.

Some embodiments may include the various databases (e.g., 109, and 114 both of FIG. 1) being relational databases, or, in some cases, On Line Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 22:
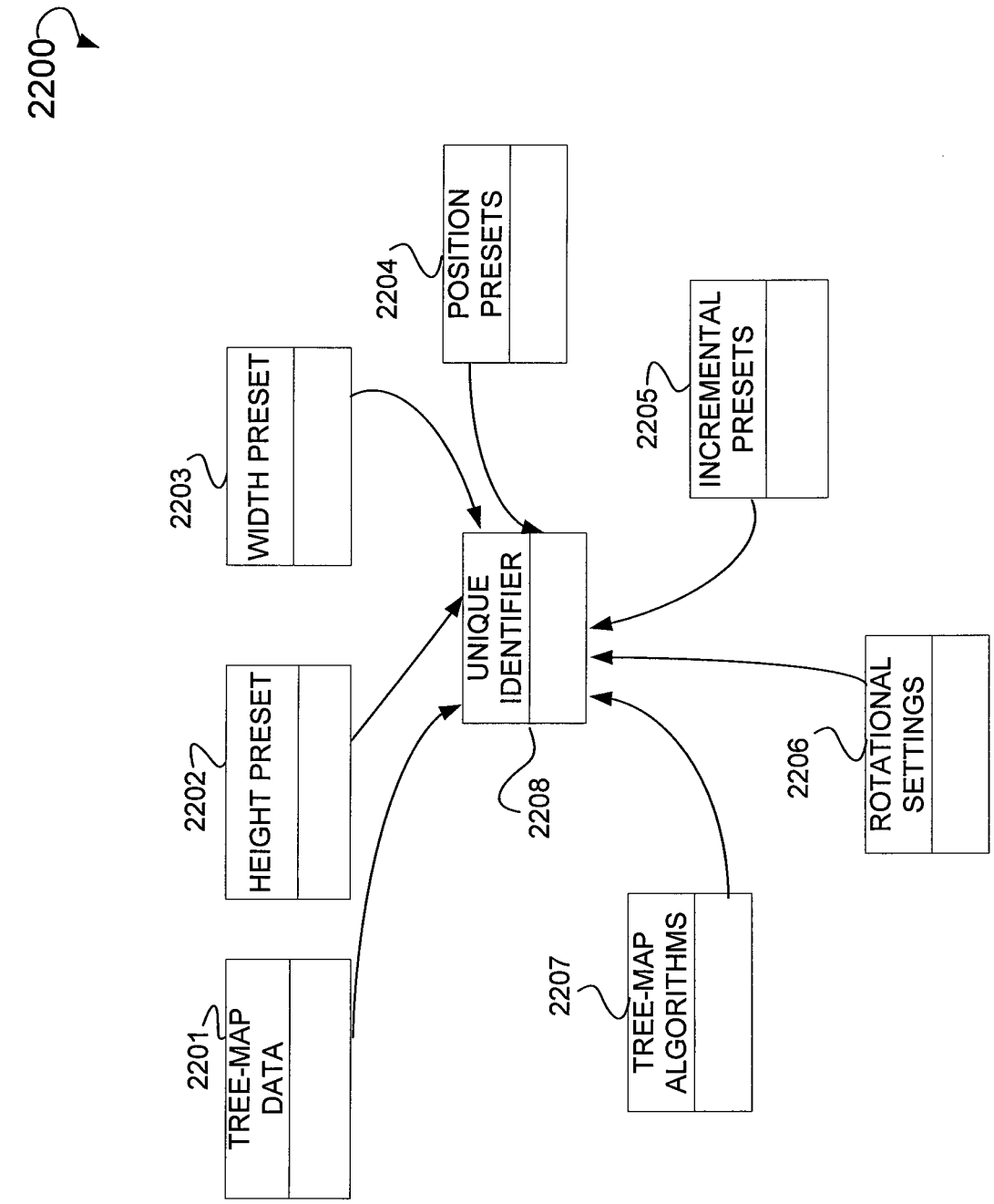
FIG. 22 is a Relational Data Schema (RDS), according to an example embodiment.

FIG. 22 is an example of RDS 2200. Shown are various tables 2201 through 2208. Illustrated is a table 2201 that includes tree-map data. This tree-map data, as previously illustrated, may include first portion of graphically represented tree-structured data, or data otherwise organized in a hierarchical manner. This tree-map data may be stored as an XML data type, an integer data type, or some other suitable data type. Further, shown is a table 2202 that includes preset height values. These preset height values may include height presets for 3D rectangles initially rendered in a transitional animation. (See e.g., 3D rectangles 220, 224 and 228 of FIG. 2). These preset height values may be stored as integer values. Additionally, a table 2203 is shown that includes preset width values. These preset width values may be used by a transitional animation to establish the width of a particular 3D rectangle. (See e.g., 3D rectangles 220, 224, 228). These preset width values may be stored as an integer value. Table 2204 includes coordinate presets. These coordinate presets may include the X and Y coordinate values within a display area that a 3D rectangle displayed as a part of a transitional animation may be initially positioned at by the transitional animation. (See e.g., 3D rectangles 220, 224, 228). These coordinate preset values may be stored as an integer data type, or an XML data type.

In some example embodiments, table 2005 includes incremental preset values. These incremental preset values may be used to incrementally change the height, width or coordinate values of a 3D rectangle during the course of displaying a transitional animation. (See e.g., 3D rectangles 220 through 223 of FIG. 2 that are a part of transitional animation 232 shown in FIG. 2). These incremental presets may be utilized by the operations 1703, 1704, 1708, 1709, 1803, 1804, 1808 and 1809, of FIGS. 17 and 18. These incremental presets may be stored as an integer, or XML data type. A table 2206 is shown that includes rotational settings. These rotational settings may dictate how a particular 3D rectangle (see e.g., 3D rectangle 226 of FIG. 2) is incrementally rotated in a clockwise or counter clockwise manner through the execution of for example operation 2005. These rotational settings may be stored as an XML, or integer data type. Shown is a table 2207 that includes tree-map algorithms. These tree-map algorithms may include a slice and dice algorithm, a squarification tree-map algorithm, or some other suitable tree-map algorithm. These tree-map algorithms may be stored as an XML data type, a Binary Large Object (BLOB), or some other suitable data type. The various entries or tuples stored within each of the tables 2201 to 2207 may be uniquely identified by one or more key values stored within the table 2208. These key values may be stored as an integer data type.

Some example embodiments may include remote procedure calls being used to implement one or more of the above-illustrated components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

Figure 23:
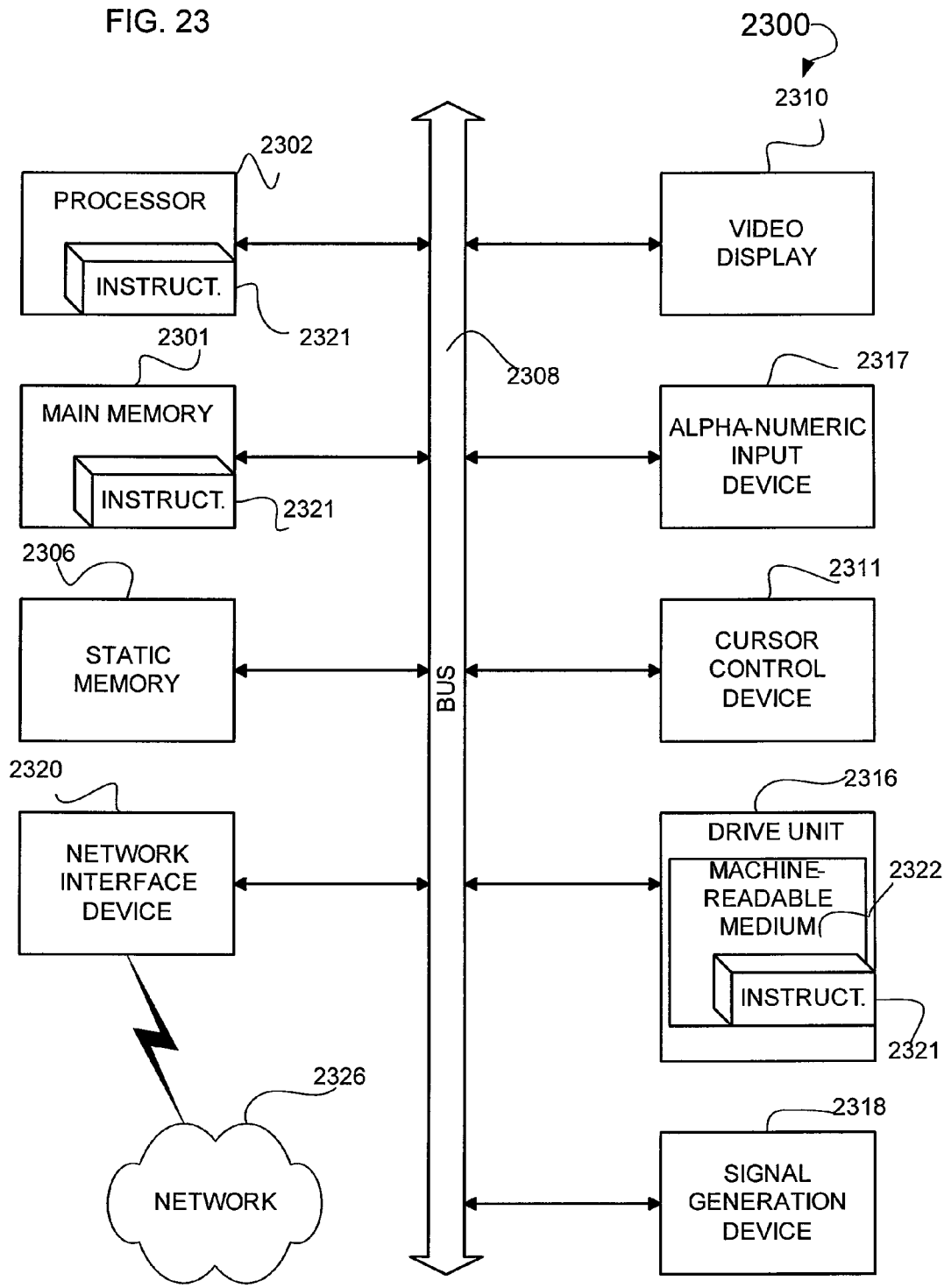
FIG. 23 shows a diagrammatic representation of a machine in the form of a computer system, according to an example embodiment, that executes a set of instructions to perform any one or more of the methods discussed herein.

FIG. 23 shows a diagrammatic representation of a machine in the example form of a computer system 2300 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2300 includes a processor 2302 (e.g., a CPU, a Graphics Processing Unit (GPU) or both), a main memory 2301, and a static memory 2306, which communicate with each other via a bus 2308. The computer system 2300 may further include a video display unit 2310 (e.g., a Liquid Crystal Display (LCD) or a Cathode Ray Tube (CRT)). The computer system 2300 also includes an alphanumeric input device 2317 (e.g., a keyboard), a User Interface (UI) (e.g., GUI) cursor controller 2311 (e.g., a mouse), a drive unit 2316, a signal generation device 2318 (e.g., a speaker) and a network interface device (e.g., a transmitter) 2320.

The disk drive unit 2316 includes a machine-readable medium 2322 on which is stored one or more sets of instructions and data structures (e.g., software) 2321 embodying or used by any one or more of the methodologies or functions illustrated herein. The software instructions 2321 may also reside, completely or at least partially, within the main memory 2301 and/or within the processor 2302 during execution thereof by the computer system 2300, the main memory 2301 and the processor 2302 also constituting machine-readable media.

The instructions 2321 may further be transmitted or received over a network 2326 via the network interface device 2320 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies illustrated herein. The term "machine-readable medium" shall accordingly be taken to include, but not be limited to, solid-state memories, optical media, and magnetic media.

What is claimed is:

1. A computer-implemented method comprising:
  displaying a two-dimensional tree representation of a hierarchical data structure;
  using at least one processor, generating a first transitional animation that graphically represents a transition, being adjusted according to a tree-map algorithm, of a first node of the two-dimensional tree representation of the hierarchical data structure to a three-dimensional tree representation as a sequence of three-dimensional parallelograms, the sequence to be displayed between a first location with respect to the two-dimensional tree representation and a second location with respect to the three-dimensional tree representation of the hierarchical data structure;
  graphically rendering, according to the first transitional animation, the first node of the two-dimensional tree representation of the hierarchical data structure as a nested three-dimensional parallelogram at the second location; and
  displaying the nested three-dimensional parallelogram as a final form three-dimensional parallelogram included in the sequence of three-dimensional parallelograms at the second location with respect to the three-dimensional tree representation of the hierarchical data structure,
  wherein at least one three-dimensional parallelogram included in the sequence of three-dimensional parallelograms is adjusted to approximate the final form three-dimensional parallelogram, and the at least one three-dimensional parallelogram is rotated along at least one of an X axis or a Y axis.

2. The computer-implemented method of claim 1, wherein the tree-mapping algorithm includes at least one of a binary tree-map algorithm, an ordered tree-map algorithm, a slice-and-dice tree-map algorithm, a squarified tree-map algorithm, or a strip tree-map algorithm.

3. The computer-implemented method of claim 2, further comprising applying the tree-map algorithm to the first portion of the two-dimensional tree representation of the hierarchical data structure to generate the final form three-dimensional parallelogram, the final form including at least one of a final height value, a final width value, a final X coordinate value, or a final Y coordinate value.

4. The computer-implemented method of claim 3, wherein the generation of the final form three-dimensional parallelogram includes adjusting a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate.

5. The computer-implemented method of claim 1, wherein the adjusting includes at least one of decrementing or incrementing a height value, a width value, an X coordinate value, or a Y coordinate value of the at least one three-dimensional parallelogram.

6. The computer-implemented method of claim 1, wherein the at least one three-dimensional parallelogram, included in the sequence of three-dimensional parallelograms, has at least one of a different height value, different width value, different X coordinate value, or different Y coordinate value as compared to another three-dimensional parallelogram included in the sequence of three-dimensional parallelograms.

7. The computer-implemented method of claim 1, wherein the final form three-dimensional parallelogram includes at least one of a cube or a cuboid.

8. A computer-implemented method comprising:
receiving a tree-map request identifying a first node of graphically represented two-dimensional tree-structured data to be translated into a sequence of three-dimensional parallelograms;
using at least one processor, generating instructions used to translate the first node of graphically represented two-dimensional tree-structured data into a three-dimensional tree representation according to the sequence of three-dimensional parallelograms, the translation of the first node of the two-dimensional tree-structured data being adjusted through applying a tree-map algorithm to the first node of graphically represented two-dimensional tree-structured data;
according to the generated instructions, graphically rendering the sequence of three-dimensional parallelograms into a nested three-dimensional parallelogram at a final display location; and
transmitting the instructions as a tree-map rendering script that is used to render the sequence of three-dimensional parallelograms into the nested three-dimensional parallelogram in a display area,
wherein the instructions further comprise an instruction to adjust at least one three-dimensional parallelogram included in the sequence of three-dimensional parallelograms to approximate a final form three-dimensional parallelogram at the final display location, and an instruction to rotate the at least one three-dimensional parallelogram along at least one of an X axis or a Y axis.

9. The computer-implemented method of claim 8, wherein the translation of the first portion of graphically represented two-dimensional tree-structured data into the sequence of three-dimensional parallelograms includes generating at least one of a final height value, a final width value, a final X coordinate, or a final Y coordinate.

10. The computer-implemented method of claim 9, wherein the rendering script used to render the sequence of three-dimensional parallelograms includes an instruction to adjust a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate.

11. The computer-implemented method of claim 10, wherein the instruction to adjust includes at least one of an instruction to decrement or an instruction to increment a height value, a width value, an X coordinate value, or a Y coordinate value of the at least one three-dimensional parallelogram.

12. A computer system comprising:
a display to display a two-dimensional tree representation of a hierarchical data structure;
an animation generation engine to generate a first transitional animation that graphically represents a transition, being adjusted according to a tree-map algorithm, of a first node of the two-dimensional tree representation of the hierarchical data structure to a three-dimensional tree representation as a sequence of three-dimensional parallelograms, the sequence to be displayed between a first location with respect to the two-dimensional tree representation and a second location with respect to a three-dimensional tree representation of the hierarchical data structure and to graphically render, according to the first transitional animation, the first node of the two-dimensional tree representation of the hierarchical data structure as a nested three-dimensional parallelogram at the second location; and
the display to display a final form three-dimensional parallelogram included in the sequence of three-dimensional parallelograms at the second location with respect to the three-dimensional tree representation of the hierarchical data structure,
wherein at least one three-dimensional parallelogram included in the sequence of three-dimensional parallelograms is adjusted to approximate the final form three-dimensional parallelogram, and the at least one three-dimensional parallelogram is rotated along at least one of an X axis or a Y axis.

13. The computer system of claim 12, wherein the tree-mapping algorithm includes at least one of a binary tree-map algorithm, an ordered tree-map algorithm, a slice-and-dice tree-map algorithm, a squarified tree-map algorithm, or a strip tree-map algorithm.

14. The computer system of claim 13, wherein the animation generation engine applies the tree-map algorithm to the first portion of the tree representation of the hierarchical data structure to generate the final form three-dimensional parallelogram, the final form including at least one of a final height value, a final width value, a final X coordinate value, or a final Y coordinate value.

15. The computer system of claim 14, wherein the animation generation engine generates the final form three-dimensional parallelogram through adjusting a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate.

16. The computer system of claim 12, wherein the adjustment includes at least one of decrementing or incrementing a height value, a width value, an X coordinate value, or a Y coordinate value of the at least one three-dimensional parallelogram.

17. The computer system of claim 12, wherein the at least one three-dimensional parallelogram, included in the sequence of three-dimensional parallelograms, has at least one of a different height value, different width value, different X coordinate value, or different Y coordinate value as compared to another three-dimensional parallelogram included in the sequence of three-dimensional parallelograms.

18. The computer system of claim 12, wherein the final form three-dimensional parallelogram includes at least one of a cube or a cuboid.

19. A computer system comprising:
a receiver to receive a tree-map request that identifies a first node of graphically represented tree-structured data to be translated into a sequence of three-dimensional parallelograms;
an instruction generation engine to generate instructions used to translate the first node of graphically represented two-dimensional tree-structured data into a three-dimensional tree representation according to the sequence of three-dimensional parallelograms, the translation of the first node of the two-dimensional tree-structured data being adjusted through applying a tree-map algorithm to the first node of graphically represented two-dimensional tree-structured data, the generated instructions being further used to graphically render the sequence of three-dimensional parallelograms into a nested three-dimensional parallelogram at a final display location; and a transmitter to transmit the instructions as a tree-map rendering script that is used to render the sequence of three-dimensional parallelograms into the nested three-dimensional parallelogram in a display area, wherein the instructions further comprise an instruction to adjust at least one three-dimensional parallelogram included in the sequence of three-dimensional parallelograms to approximate a final form three-dimensional parallelogram at the final display location, and an instruction to rotate the at least one three-dimensional parallelogram along at least one of an X axis or a Y axis.

20. The computer system of claim 19, wherein the translation of the first portion of graphically represented tree-structured data into the sequence of three-dimensional parallelograms includes generating at least one of a final height value, a final width value, a final X coordinate, or a final Y coordinate.

21. The computer system of claim 19, wherein the rendering script used to render the sequence of three-dimensional parallelograms includes an instruction to adjust a three-dimensional parallelogram, included in the sequence of three-dimensional parallelograms, to have at least one of a height value, a width value, an X coordinate value, or a Y coordinate value equivalent to at least one of the final height value, the final width value, the final X coordinate, or the final Y coordinate.

22. The computer system of claim 21, wherein the instruction to adjust includes at least one of an instruction to decrement or an instruction to increment a height value, a width value, an X coordinate value, or a Y coordinate value of the at least one three-dimensional parallelogram.

23. A non-transitory machine-readable storage medium comprising instructions, which when implemented by one or more machines, cause the one or more machines to perform the following operations:

display a two-dimensional tree representation of a hierarchical data structure;

generate a first transitional animation that graphically represents a transition, being adjusted according to a tree-map algorithm, of a first node of the two-dimensional tree representation of the hierarchical data structure to a three-dimensional tree representation as a sequence of three-dimensional parallelograms, the sequence to be displayed between a first location with respect to the two-dimensional tree representation and a second location with respect to a three-dimensional tree representation of the hierarchical data structure;

graphically render, according to the first transitional animation, the first node of the two-dimensional tree representation of the hierarchical data structure as a nested three-dimensional parallelogram at the second location; and display the nested three-dimensional parallelogram as a final form three-dimensional parallelogram included in the sequence of three-dimensional parallelograms at the second location with respect to the three-dimensional tree representation of the hierarchical data structure, wherein at least one three-dimensional parallelogram included in the sequence of three-dimensional parallelograms is adjusted to approximate the final form three-dimensional parallelogram, and the at least one three-dimensional parallelogram is rotated along at least one of an X axis or a Y axis.

\* \* \* \* \*